US011417072B2

(12) United States Patent
Cunliffe et al.

(10) Patent No.: US 11,417,072 B2
(45) Date of Patent: Aug. 16, 2022

(54) AUTOMATED FITTING OF MULTIPLE ARTICLES OF PERSONAL PROTECTION EQUIPMENT CONCURRENTLY WORN BY A USER

(71) Applicant: 3M INNOVATIVE PROPERTIES COMPANY, St. Paul, MN (US)

(72) Inventors: Alexandra R. Cunliffe, St. Paul, MN (US); Caroline M. Ylitalo, Stillwater, MN (US); Guruprasad Somasundaram, Woodbury, MN (US); Benjamin D. Zimmer, Hudson, WI (US); Jonathan D. Gandrud, Woodbury, MN (US); Claire R. Donoghue, Reading (GB)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/250,080

(22) PCT Filed: May 15, 2019

(86) PCT No.: PCT/IB2019/054035

§ 371 (c)(1),
(2) Date: Nov. 20, 2020

(87) PCT Pub. No.: WO2019/224665

PCT Pub. Date: Nov. 28, 2019

(65) Prior Publication Data

US 2021/0209865 A1 Jul. 8, 2021

Related U.S. Application Data

(60) Provisional application No. 62/674,429, filed on May 21, 2018.

(51) Int. Cl.
*G06T 19/20* (2011.01)
*G06K 9/62* (2022.01)
(Continued)

(52) U.S. Cl.
CPC .............. *G06T 19/20* (2013.01); *G06K 9/628* (2013.01); *G06F 30/20* (2020.01); (Continued)

(58) Field of Classification Search
CPC . G06T 19/20; G06T 2210/16; G06T 2210/21; G06T 2219/2004;
(Continued)

(56) References Cited

U.S. PATENT DOCUMENTS 7,475,982 B2 1/2009 Welchel
7,488,068 B2 2/2009 Welchel
(Continued)

FOREIGN PATENT DOCUMENTS

WO WO 2014-150739 9/2014
WO WO 2014-180657 11/2014
(Continued)

OTHER PUBLICATIONS

Working together? Safety Spotlight—Compatibility, 3M Uk Occupational Health & Environmental Safety Group, Dec. 31, 2011, [Retrieved from the Internet] URL: <https•//www arco.co.uk/103/content/factsheets/TechnicalBulletin Compatibility.pdf>, 4 pages, XP55626643A.

(Continued)

*Primary Examiner* — YuJang Tswei
(74) *Attorney, Agent, or Firm* — Steven A. Bern

(57) ABSTRACT

A system and method of selecting personal protection equipment (PPE) for a worker. The system identifies sets of PPEs and simulates a fitting of the identified PPE sets to the worker. Fitting includes, for each of the identified PPE sets,
(Continued)

selecting a three-dimensional computer model for each article of the PPE set, placing the computer model of each of the PPE articles of the PPE set being fitted on a computer model representing the worker, identifying collisions between the computer models as placed, and taking an action based on the identified collisions.

20 Claims, 11 Drawing Sheets

(51) Int. Cl.
*G06F 30/20* (2020.01)
*G06F 111/10* (2020.01)
*G06T 19/00* (2011.01)

(52) U.S. Cl.
CPC ........ *G06F 2111/10* (2020.01); *G06K 9/6229* (2013.01); *G06T 19/00* (2013.01); *G06T 2210/16* (2013.01); *G06T 2210/21* (2013.01); *G06T 2219/2004* (2013.01); *G06T 2219/2016* (2013.01)

(58) Field of Classification Search
CPC . G06T 2219/2016; G06T 19/00; G06K 9/628; G06K 9/6229; G06F 30/20; G06F 2111/10
See application file for complete search history.

(56) References Cited

U.S. PATENT DOCUMENTS

| | | | | |
|---|---|---|---|---|
| 9,361,411 | B2 | 6/2016 | Thiruvengada | |
| 2001/0026272 | A1* | 10/2001 | Feld | G06T 17/00 345/419 |
| 2014/0278320 | A1* | 9/2014 | Wang | G16B 5/00 703/11 |
| 2014/0307076 | A1* | 10/2014 | Deutsch | F16P 3/147 348/77 |
| 2017/0206534 | A1* | 7/2017 | O'Brien | G06K 7/10297 |
| 2018/0276598 | A1* | 9/2018 | Y | A41D 1/002 |

FOREIGN PATENT DOCUMENTS

| | | |
|---|---|---|
| WO | WO 2018-064212 | 4/2018 |
| WO | WO 2019-069191 | 4/2019 |
| WO | WO 2020-136587 | 7/2020 |

OTHER PUBLICATIONS

International Search Report for PCT International Application No. PCT/IB2019/054035, dated Oct. 7, 2019, 5 pages.

* cited by examiner

2
PERSONAL PROTECTION EQUIPMENT MONITORING SYSTEM 6
NETWORK 4
18
REMOTE USER 24
REMOTE USER 24
ENVIRONMENT 8A
ACCESS POINT 14A
ENVIRONMENT 8B
SAFETY STATION 15B
21A
17B
19B
19C
17A
13B
WORKER 10B
13N
WORKER 10N
17C
21B
13C
WORKER 10C
ACCESS POINT 14B
12
23
13A
10A
CAMERA 22
19A
16
7
USER 20
USER 20
SAFETY STATION 15A

AUTOMATED FITTING OF MULTIPLE ARTICLES OF PERSONAL PROTECTION EQUIPMENT CONCURRENTLY WORN BY A USER

CROSS REFERENCE TO RELATED APPLICATIONS

This application is a national stage filing under 35 U.S.C. 371 of PCT/IB2019/054035, filed May 15, 2019, which claims the benefit of U.S. Provisional Application No. 62/674,429, filed May 21, 2018, the disclosure of which is incorporated by reference in its/their entirety herein.

TECHNICAL FIELD

The present application relates generally to personal protection equipment and to automated techniques for fitting personal protection equipment to a user.

BACKGROUND

Personal protective equipment (PPE) such as respirators, protective eyewear, hard hats and ear muffs are used by workers to provide protection against workplace hazards. A worker may be required to wear one or more PPEs selected from respiratory protection equipment, protective eyewear, protective headwear, hearing protection devices, protective shoes, protective gloves, protective clothing, or other such PPEs.

Many workers wear two or more PPEs simultaneously. Oftentimes the PPEs do not fit well together, reducing the protection and potentially exposing the worker to hazards. For example, when a worker wears a reusable respirator and safety eyewear, the presence of the respirator on the face may push upward on the eyewear, creating a gap between the respirator and the eyewear. Careful selection of PPE models and sizes, such as by fit testing by trained personnel, may reduce such problems, but the process may be time consuming and may require a large inventory of different makes, models and sizes of PPEs to support a trial and error approach to selecting compatible PPEs.

SUMMARY

This disclosure describes a personal protection equipment (PPE) fitting system for fitting, to a worker, PPE sets having two or more PPEs, in accordance with one aspect of the present disclosure. More specifically, various examples of the multi-PPE fitting system are described that enable improved automated or semi-automated fitting of PPE sets on the worker based on three-dimensional computer models of all or part of the worker and of the PPEs being fitted. As described, in some example, the PPE fitting system is configured to output a recommendation, such as by calculating respective fitness scores for different sets of multiple-PPEs based on an interaction between the computer models of the PPEs and the computer model of the worker. In this way, the example implementations described herein provide digital solutions that virtually apply available PPE models to a digital representation of the end user's face to help identify, for example, best-fitting compatible PPEs on a user-specific basis.

As noted above, workers often are required to wear two or more PPEs simultaneously. Sometimes, the PPEs do not fit well together, reducing the protection and potentially exposing the worker to hazards. For example, when a worker wears a reusable respirator and safety eyewear, the presence of the respirator on the face may push upward on the eyewear, creating a gap between the respirator and the eyewear. Careful selection of PPE models and sizes may reduce such problems, but the process is time consuming and may require a large inventory of different makes, models and sizes of PPEs to support a trial and error approach to selecting compatible PPEs. By using computer models to simulate interactions between the PPEs and between the PPEs and the worker, one can test a variety of PPEs and may be able to select a set of PPEs that fits more comfortably and provides more protection than that provided by trial-and-error testing of a limited selection of PPEs.

In some example approaches, the PPE fitting system enables automated or semi-automated fitting of PPE sets on the worker based on three-dimensional computer models of all or part of the worker and of the PPEs being fitted.

In some example approaches, the PPE fitting system is configured to apply techniques to automatically reduce and/or eliminate collisions between the computer models of the PPEs and between the computer models of the PPEs and the computer model of the worker when fitting a PPE set to the worker to facilitate the selection of PPE sets having PPEs that have a high likelihood of functioning together and of satisfying safety fit tests when subsequently worn by the worker. In this way, the PPE fitting system may provide certain technical advantages, such as improved accuracy with respect to fit testing and collision detection using multiple computer models.

In some example approaches, the PPE fitting system obtains a three-dimensional model of a worker's face and three-dimensional models of each of the PPEs in each of the sets of PPEs to be fitted to the worker's face. The PPE fitting system determines, for each PPE set, whether collisions exist between the PPE models of the PPE set and between the PPE models and the model of the worker's face and takes steps to reduce the collisions. The PPE fitting system then generates a fitness score for each set of PPEs. In one example approach, the PPE fitting system translates one or more of the PPE models in the PPE set relative to model of the face to minimize or otherwise reduce collisions between the computer models and replaces PPEs with a different size or model of PPE if the collisions cannot be limited to an acceptable degree. In another example approach, the PPE fitting system is configured to apply perturbations to one or more of the PPE models in the PPE set to reduce collisions between the PPE models and between the PPE models and the model of the worker, thereby achieving certain technical improvements with respect to accuracy, for example. In yet another example approach, the PPE fitting system replaces a PPE in the set with a different size or model of PPE if the collisions cannot be limited to an acceptable degree.

In one example approach, a system comprises a display and a computing device coupled to the display, wherein the computing device comprises a memory and one or more processors coupled to the memory. The memory comprises instructions that when executed by the one or more processors: identify one or more sets of Personal Protective Equipment (PPE), wherein each of the PPE sets includes at least two or more articles of PPE; and simulate a fitting of the PPE articles of the identified one or more PPE sets to the worker, wherein the instructions that when executed by the one or more processors simulate the fitting of the PPE articles to the worker comprise instructions that when executed, cause the one or more processors to, for each of the identified PPE sets: select a three-dimensional computer model for each PPE article of the PPE set; obtain a computer model representing the worker, wherein the computer model representing the worker depicts at least a portion of the worker; determine, for the PPE set being fitted, a placement of the computer model of each of the PPE articles of the PPE set on the computer model representing the worker; identify at least one collision between the computer models as placed; and perform at least one operation based on the identified collisions; and output, on the display and based at least in part on the at least one operation, one or more messages reflective of the operation.

In another example approach, a method of selecting personal protection equipment (PPE) for a worker comprises identifying one or more sets of Personal Protective Equipment (PPE), wherein each of the PPE sets includes at least two or more articles of PPE and simulating, by the computing device, a fitting of the PPE articles of the identified one or more PPE sets to the worker, wherein simulating the fitting comprises, for each of the identified PPE sets: selecting, by the computing device, a three-dimensional computer model for each PPE article of the PPE set; obtaining a computer model representing the worker, wherein the computer model representing the worker depicts at least a portion of the worker; determining, for the PPE set being fitted, a placement of the computer model of each of the PPE articles of the PPE set on the computer model representing the worker; identifying collisions between the computer models as placed; and taking an action based on the identified collisions. The method further comprises outputting, on the display, one or more messages reflective of the action.

In yet another example approach, a system comprises a display and a computing device coupled to the display, wherein the computing device comprises a memory and one or more processors coupled to the memory. The memory comprises instructions that when executed by the one or more processors, identify one or more sets of Personal Protective Equipment (PPE), wherein each of the PPE sets includes at least a first article of PPE and a second article of PPE; and perform a multi-PPE fit test of the identified one or more PPE sets to the worker. The multi-PPE fit test includes, for each of the PPE sets: selecting, for each article of PPE of the PPE set being fitted, an associated three-dimensional computer model of the PPE article; obtaining a computer model representing the worker, wherein the computer model representing the worker depicts at least a portion of the worker; determining, for the PPE set being fitted, an initial placement of the computer model of the first article of PPE on the computer model representing the worker; identifying collisions between the computer model of the first article of PPE and the computer model representing the worker when the computer model of the first article of PPE is placed at the initial placement location of the first article of PPE; determining, for the PPE set being fitted, an initial placement of the computer model of the second article of PPE on the computer model representing the worker; identifying collisions between the computer model of the second article of PPE and the computer model of the worker when the computer model of the second article of PPE is placed at the initial placement location of the second article of PPE; identifying collisions between the computer model of the second article of PPE and the computer model of the first article of PPE when the computer model of the second article of PPE is placed at the initial placement location of the second article of PPE; and calculating, based on the collisions identified for each article of PPE in the PPE set, a multi-PPE fitness score for each PPE set. The memory comprises instructions that when executed by the one or more processors, output, on the display, one or more messages responsive to the multi-PPE fitness scores.

The techniques of this disclosure may be used to fit PPEs to a worker in a safety conscious and time-efficient manner.

DETAILED DESCRIPTION

Figure 1:
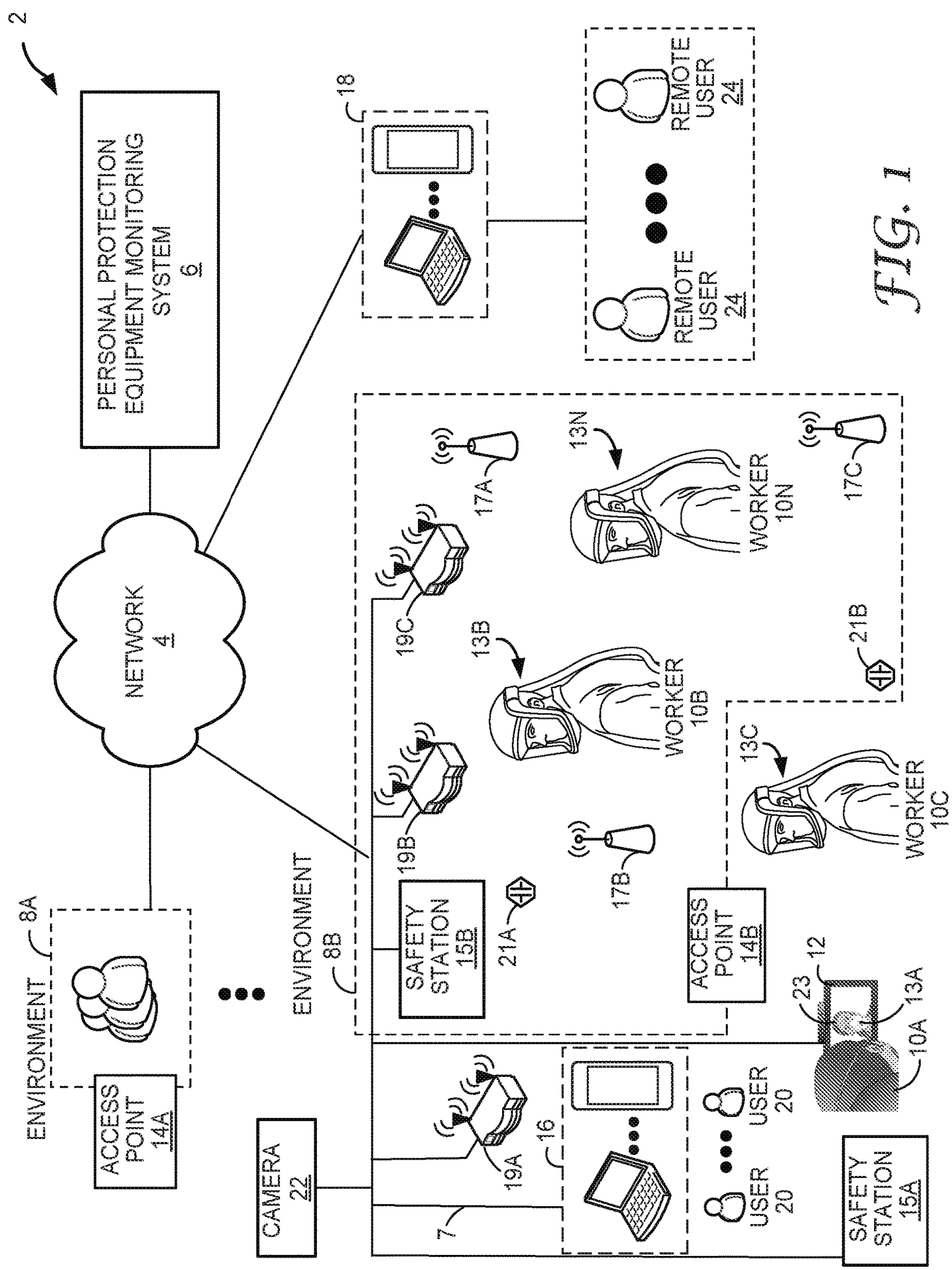
FIG. 1 is a block diagram illustrating a system that employs a personal protection equipment monitoring system (PPEMS) across one or more work environments, in accordance with one aspect of the present disclosure.

FIG. 1 is a block diagram illustrating a system that employs a personal protection equipment monitoring system (PPEMS) across one or more work environments, in accordance with one aspect of the present disclosure. In the example approach of FIG. 1, system 2 includes a personal protection equipment monitoring system (PPEMS) 6 that identifies and monitors the use of one or more articles of PPE 13A-13N (collectively, "articles of PPE 13") by a worker 10 in a work environment 8. As described herein, PPEMS 6 determines one or more articles of PPE for a worker to use prior to a worker entering work environment 8A or 8B (collectively, "environments 8") and/or before performing a job function. By interacting with PPEMS 6, workers 10 can be informed of one or more articles of PPE that he or she should be equipped with and can confirm that they are properly prepared to enter environments 8. In some examples, PPEMS 6 may also be used to verify that a worker, such as workers 10A-10N (collectively, "workers 10"), is equipped with the correct one or more articles of PPE 13 prior to entering work environments 8 via an access point 14A or 14B (collectively, "access points 14").

In general, PPEMS 6 may identify one or more articles of PPE for a worker to use, may model and judge the fit of articles of PPE on the worker, may display selected articles of PPE for a worker to use, acquire data, monitor and log compliance, generate reports, provide in depth analytics, and generate alerts. For example, PPEMS 6 may include an underlying analytics and alerting system in accordance with various examples described herein, which may be used to alert a worker or another user of one or more articles of PPE that are incorrect or missing from one or more articles of PPE worn by a worker. In some examples, the underlying analytics and alerting system may be used to determine that a worker is wearing the proper size article of PPE, that the worker has been properly trained to use an article of PPE, that all the required articles of PPE are worn by the worker, and/or that a confidence level of the determinations has been achieved.

As further described below, PPEMS 6 provides an integrated suite of PPE determination tools and implements various techniques of this disclosure. That is, PPEMS 6 provides an integrated, end-to-end system for determining articles of PPE that a worker 10A-10N is required to wear and/or for verifying articles of PPE worn by workers 10 prior to allowing the worker to enter one or more environments 8. In some examples, environments 8 may include construction sites, mining, confined spaces, manufacturing sites, or any physical environment. The techniques of this disclosure may be realized within various parts of system 2.

As shown in the example of FIG. 1, system 2 represents a computing environment in which a computing device 16 at access point 14A or 14B, and/or within or proximate to a plurality of environments 8, may electronically communicate with PPEMS 6 via one or more computer networks 4. Each environment 8 represents a physical environment, such as a work environment, in which one or more individuals, such as workers 10, utilize PPE while engaging in tasks or activities within the respective environment. As shown in FIG. 1, each of the environments 8 may have an access point 14 through which workers 10 gain entrance into the environment 8.

In the example of FIG. 1, environment 8A is shown as generally having workers 10, while environment 8B is shown in expanded form to provide more detail. In the example of FIG. 1, a plurality of workers 10B-10N are shown within environment 8B wearing respective articles of PPE 13B-13N. Worker 10C is shown wearing a respective article of PPE 13C at access point 14B outside of environment 8B. As shown, for example, in FIG. 1, each worker 10 may wear a respirator as an article of PPE 13A-13N. In other examples, workers 10 may use one or more additional or alternative articles of PPE 13. In some cases, one or more articles of PPE 13 may be configured to transmit data from a sensor of the one or more articles of PPE 13 to network 4. For example, one or more articles of PPE 13 may be configured to transmit data relating to the usage, the useful life, the status, or the like of the one or more articles of PPE 13 to a device through network 4.

Each of environments 8 may include computing facilities (e.g., a local area network) by which one or more computing devices 16 at access points 14 and/or within environments 8 are able to communicate with PPEMS 6. For example, access points 14 and/or environments 8 may be configured with wireless technology, such as 802.11 wireless networks, 802.15 ZigBee networks, or the like. In the example of FIG. 1, access point 14B and environment 8B include a local network 7 that provides a packet-based transport medium for communicating with PPEMS 6 via network 4. In addition, access point 14B and/or environment 8B may include a plurality of wireless access points 19A-19C geographically distributed throughout access point 14B and/or environment 8B to provide support for wireless communications both inside and outside of access point 14B and/or work environment 8B.

As shown in the example of FIG. 1, an environment, such as environment 8B, may also include one or more wireless-enabled beacons, such as beacons 17A-17C (collectively, "beacons 17"), that provide accurate location information within the work environment. For example, beacons 17 may be GPS-enabled such that a controller within the respective beacon may be able to precisely determine the position of the respective beacon.

In addition, an environment, such as environment 8B, may also include one or more wireless-enabled sensing stations, such as sensing stations 21A and 21B (collectively, "sensing stations 21"). Each sensing station 21 includes one or more sensors and a controller configured to output data indicative of sensed environmental conditions. Moreover, sensing stations 21 may be positioned within respective geographic regions of environment 8B or may otherwise interact with beacons 17 to determine respective positions and may include such positional information when reporting environmental data to PPEMS 6. As such, PPEMS 6 may be configured to correlate the sensed environmental conditions with the regions of a work environment 8. For example, PPEMS 6 may use the environmental data to aid when generating alerts or other instructions to workers 10 at access point 14B. For instance, PPEMS 6 may use such environmental data to inform workers 10 of environmental conditions he or she may experience upon entrance to work environment 8B. Example environmental conditions that may be sensed by sensing stations 21 include but are not limited to temperature, humidity, presence or absence of a gas, pressure, visibility, wind, or the like.

In some examples, access point 14B and/or environment 8B may also include one or more safety stations 15A, 15B (collectively, "safety stations 15") for accessing one or more articles of PPE 13, such as the respirators shown in FIG. 1. Safety stations 15 may allow workers 10 to check out one or more articles of PPE 13, exchange a size of one or more articles of PPE 13, exchange data, or the like. In some examples, safety stations 15 may transmit alerts, rules, software updates, and/or firmware updates to one or more articles of PPE 13.

In addition, access points 14 and/or environments 8 may include computing facilities that provide an operating environment for computing devices 16 to interact with PPEMS 6 via network 4. A user 20, such as one of the workers 10, may interact with computing devices 16 to access PPEMS 6 to identify and/or verify one or more articles of PPE 13 required for a specific job function and/or to enter environment 8. In some examples, computing devices 16 include a display 12 for use with PPEMS 6. Additionally, or alternatively, as shown in FIG. 1, a separate display 12 may be included at access point 14B and coupled to computing devices 16, or directly to PPEMS 6. In any case, computing devices 16 and display 12 (or computing devices 16 including display 12) may be connected to PPEMS 6 via local network 7.

Similarly, remote users 24 may use computing devices 18 to interact with PPEMS 6 via network 4. For example, access points 14 and/or environments 8 may include one or more safety managers responsible for overseeing safety compliance, such as PPE compliance of workers 10. In some such examples, remote users 24 may be able to access data acquired by PPEMS 6 such as, for example, PPE compliance information, training information, avatars of workers 10, images of workers 10, three-dimensional models of workers and/or PPEs, or any other data available to PPEMS 6 as described herein. Computing devices 16, 18 may include any suitable computing device, such as, for example, laptops, desktop computers, mobile devices, such as tablets and/or smartphones, or the like.

In one example approach, PPEMS 6 is configured to identify one or more articles of PPE 13A for worker 10A to use. In some such example approaches, PPEMS 6 is configured to identify one or more articles of PPE 13A the worker 10A should don before entering environment 8B. This may occur, for example, when worker 10A is at access point 14B but should occur before worker 10A enters environment 8B. In some examples, the one or more articles of PPE 13A may be identified based on an identity of worker 10A. For example, PPEMS 6 may receive identification information including at least one of an identification number, a username, biometric information, photo recognition information, or voice recognition information of worker 10A, and may use the received information to determine the identity of worker 10A. PPEMS 6 may receive the identification information in any suitable manner. For example, PPEMS 6 may receive the identification information from a worker 10A manually entering the identification information (e.g., using an input device on computing devices 16 or display 12), from a badge or identification card associated with worker 10A (e.g., using radio frequency identification, a barcode, a magnetic stripe, or the like), or by analyzing biometric information of worker 10A such as an image, a voice, a fingerprint, a retina, or the like, or through combinations thereof.

In some examples, PPEMS 6 may identify the one or more articles of PPE 13A for worker 10A to use based on a job function of worker 10A. For example, PPEMS 6 may identify a job function of worker 10A based on the identity of worker 10A. Based on the identified job function of worker 10A, PPEMS 6 may select one or more articles of PPE for worker 10A to use from one or more default articles of PPE. The one or more default articles of PPE may include one or more articles of PPE required for the identified job function of worker 10A. In this way, PPEMS 6 may identify the one or more articles of PPE 13A for worker 10A to use such that worker 10A will be properly equipped with the one or more articles of PPE 13A specific to the job function that worker 10A is scheduled to perform within environment 8B.

Additionally, or alternatively, PPEMS 6 may identify the one or more articles of PPE 13A for worker 10A to use based on one or more articles of PPE that worker 10A is trained to use. For example, PPEMS 6 may select one or more articles of PPE for worker 10A is trained to use based on the determined identity of worker 10. In turn, worker 10A may use the one or more articles of PPE 13A as intended based on that training such that the one or more articles of PPE 13A can maintain the safety and/or health of worker 10A and/or prevent harm to worker 10A due to incorrect use of the one or more articles of PPE 13A.

In some cases, PPEMS 6 may identify the one or more articles of PPE 13A for worker 10A to use based on one or more previously worn articles of PPE. For example, the one or more previously worn articles of PPE 13 may include at least one of an article of PPE 13 previously worn by worker 10A, an article of PPE previously worn within environment 8B, or an article of PPE previously worn for a specific job function (e.g., an article of PPE previously worn for the job function to be performed by worker 10A in environment 8B).

In some example approaches, PPEMS 6 selects from sets of PPEs in choosing PPEs to assign to worker 10. In one such example approach, PPEMS 6 obtains models of the PPEs in the PPE sets and a model of a worker 10 and aids determination of an appropriate PPE set for the worker 10. In some such example approaches, PPEMS 6 includes a PPE fitting system used to automate or semi-automate fitting of PPE sets on the worker based on three-dimensional computer models of all or part of the worker and of the PPEs being fitted. In one example approach, the PPE fitting system calculates a fitness score based on an interaction between the computer models of the PPEs and the computer model of the worker and takes some an action based on the identified collisions, such as outputting, on the display, one or more messages reflective of the action. For example, the messages, for example, may include multi-PPE fitness scores for the various PPE sets, a recommendation of an appropriate PPE set based on the fitness scores, and the like.

In some example approaches, PPEMS 6 is configured to display an image 23 of worker 10A. In some such example approaches, the image is an avatar designed to reflect the general size and shape of worker 10A while reducing or eliminating the display of characteristics that could be used to identify worker 10A. In some example approaches, the image 23 of worker 10A may be equipped with the one or more articles of PPE 13 identified for worker 10A to use. In some examples, PPEMS 6 may store (e.g., in a memory) one or more rendered images of articles of PPE and/or data relating to one or more rendered images of articles of PPE. For example, PPEMS 6 may include a log that stores the one or more rendered images of articles of PPE and/or data relating to the one or more rendered images of articles of PPE, and the log may include articles of PPE required for a specific job function and/or environment 8, trained to use by workers 10, previously worn by workers 10, or the like. In turn, PPEMS 6 may not have to render (e.g., from scratch) the one or more images of articles of PPE 13A for worker 10A to use each time PPEMS 6 displays an image 23 of worker 10A equipped with the identified one or more articles of PPE 13A. Instead, in some cases, PPEMS 6 may be able to display the image 23 of worker 10A and equip the image 23 with the one or more rendered images of articles of PPE (or using data relating to the one or more rendered images of articles of PPE) stored by PPEMS 6. In other examples, PPEMS 6 may render one or more new images of articles of PPE 13A for worker 10A in addition to, or as an alternative to, equipping the image 23 of worker 10A with the one or more articles of PPE identified for worker 10A to use.

In a similar manner, PPEMS 6 may display the image 23 of worker 10A based on a previously stored image 23 of worker 10A, such as based on previously stored images 23 of worker 10A and/or data relating to previously stored images 23 of worker 10A stored in a memory of PPEMS 6. Thus, in some cases, PPEMS 6 may access a previously stored image 23 used to represent worker 10A (or data relating to the previously stored image used to represent worker 10A) and equip the previously stored image 23 with the one or more articles of PPE 13A identified previously for worker 10A to use. In this way, PPEMS 6 may require less processing time and/or power to display the image 23 of worker 10A. In some examples, PPEMS 6 may modify the previously stored image of worker 10A. In other examples, PPEMS 6 may equip the previously stored image of worker 10A as-is (i.e., without modification).

As another example, PPEMS 6 may be configured to display the image 23 of worker 10A as an avatar based on a previously stored avatar of a worker 10 other than worker 10A. For example, in some cases, PPEMS 6 may not include any previously stored images of worker 10A, such as the first time a worker 10A uses PPEMS 6, and PPEMS 6 may access a previously stored avatar of a worker 10 other than worker 10A to display the image for worker 10A. In some examples, displaying the avatar for worker 10A based on a previously stored avatar of another worker 10 may reduce the processing time and/or power of PPEMS 6 needed to display the image for worker 10A.

Additionally, or alternatively, PPEMS 6 may render a new avatar (e.g., not based on a previously presented avatar) of worker 10A. In some cases, PPEMS 6 may render a new avatar of worker 10A based on an image of worker 10A. In some such examples, system 2 may optionally include a camera 22 (or another image capture device) to capture an image of worker 10A, such as, for example, when worker 10A is at access point 14B. In some examples, camera 22 may include an Intel® RealSense™ camera available from Intel Corp. of Santa Clara, Calif. As another example, PPEMS 6 may include one or more stored images or avatars of worker 10A. In any case, PPEMS 6 may use a stored image, a captured image, or any combination of stored images and/or captured images of worker 10A to render an avatar for worker 10A based on an image 23 of worker 10A. PPEMS 6, in some examples, may analyze the one or more images of worker 10A to obtain data relating to the image to render the new avatar of worker 10A.

In some examples, the avatar may be configured to resemble worker 10A in at least one of hair color, eye color, height, weight, facial features, skin tone, or attire. For example, one or more images of worker 10A may be analyzed to determine a hair color, an eye color, a height, a weight, facial features, a skin tone, and/or attire of worker 10A to incorporate such features in the rendered avatar. Although the avatar of worker 10A may be configured to resemble worker 10A, some example approaches, image 23 may be a cartoon or otherwise limited rendition of worker 10A and not an actual image of worker 10A. Thus, PPEMS 6 may identify and display the one or more articles of PPE 13A on image 23 for worker 10A to view and use, while maintaining the privacy of worker 10A.

Regardless of how PPEMS 6 displays image 23 of worker 10A or the one or more articles of PPE 13A for worker 10A to use, in one example approach PPEMS 6 equips the image with representations of the one or more articles of PPE 13A identified for worker 10A to use. For example, as described above, the one or more articles of PPE 13A may be identified based on a job function, environment 8B, articles of PPE that worker 10A is trained to use, one or more articles of previously worn PPE, or the like.

In one example approach, display 12 presents the image 23 of worker 10A equipped with the article of PPE 13 identified for worker 10A to use prior to worker 10A entering environment 8B and/or while worker 10A is at access point 14B. In this way, worker 10A may use the displayed image 23, as equipped with the one or more articles of PPE 13A to ensure that he or she is equipped with the proper one or more articles of PPE 13A prior to entering environment 8B and/or performing a certain job function. Such an approach may enable worker 10A to take control of ensuring that he or she is wearing the proper PPE. In some cases, putting worker 10A in control of his or her own PPE compliance may be more effective in encouraging worker 10A to conform to PPE policies and requirements than having a supervisor, a safety manager, another worker 10, or the like verifying the PPE compliance of worker 10A. An example display 12 (e.g., user interfaces) of a worker equipped with the one or more identified articles of PPE is described in more detail with respect to FIG. 3.

In examples in which system 2 includes camera 22 or another image capture device, PPEMS 6 may be configured to display image 23 as a moving avatar of worker 10A that is equipped with the one or more articles of PPE 13A for worker 10A to use. In some such examples, PPEMS 6 may periodically or continuously capture images of worker 10A (e.g., using camera 22). PPEMS 6 may compare a first image to a second image, in which the first image was captured at an earlier time than the second image and determine a movement of worker 10A based on the comparison of the first and second images. If a movement of worker 10A is determined, PPEMS 6 may display a moving avatar of worker 10A that mirrors the determined movement of worker 10A. In this way, PPEMS 6 may display a moving avatar of worker 10A such that what is shown on display 12 serves as a mirror reflecting a moving image of worker 10A as worker 10A moves. As one example, PPEMS 6 compares a first image of worker 10A captured by camera 22 to a second image of worker 10A to determine whether worker 10A put on or removed one of the articles of PPE 13A identified for worker 10A to use and may display a moving avatar putting on or removing that article of PPE.

In some examples, PPEMS 6 may enable worker 10A to confirm that he or she is wearing the one or more articles of PPE 13A on the displayed image 23 of worker 10A. In some such cases, system 2 may include one or more input devices, such as, for example, a keyboard, a keypad, a touch screen, or the like. In some examples, display 12 and/or computing devices 16 may include the one or more input devices. Worker 10A may be able to confirm that he or she is wearing the one or more articles of PPE 13A identified by PPEMS 6 using the one or more input devices. PPEMS 6 may enable worker 10A to confirm the one or more articles of PPE 13A in any suitable manner. For example, worker 10A may be able to check off, select, or otherwise indicate using a touch screen of display 12 or another input device that he or she is wearing each article of the one or more articles of PPE 13A worn by the displayed image. PPEMS 6 may display an indication of the received confirmation of the one or more articles of PPE (e.g., received by PPEMS 6 from worker 10A using one or more input devices). In some examples, a user other than worker 10A may input confirmation of one or more articles of PPE 13. For example, a supervisor, an attendant, or the like may input the confirmation.

In some examples, in addition to, or as an alternative to, PPEMS 6 receiving confirmation from worker 10A, PPEMS 6 may be configured to verify one or more articles of PPE 13A worn by worker 10A. For example, PPEMS 6 may capture an image of worker 10A using camera 22 and may analyze the captured image of worker 10A to identify one or more articles of PPE worn by the worker in the image. The one or more articles of PPE worn by worker 10A in the image may include one or more articles of PPE 13A worn by worker 10A in the captured image. PPEMS 6 may compare the one or more articles of PPE worn by worker 10A in the image to the one or more articles of PPE 13A identified for worker 10A to use (e.g., the one or more articles of PPE 13A equipped on the image of worker 10A). The comparison may be used to determine and/or verify that worker 10A is wearing all the articles of PPE 13A identified by PPEMS 6 for worker 10A to use, that the articles of PPE worn by worker 10A in the image are the proper size for worker 10A, that worker 10A is trained to use the articles of PPE worn by worker 10A in the image, a confidence level of the identification accuracy, or the like.

In this way, verification that the one or more articles of PPE worn by worker 10A in the image correspond to the one or more articles of PPE 13A equipped on the image of worker 10A may prevent worker 10A from manually having to verify and/or confirm each article of PPE of the one or more articles of PPE 13A. Moreover, PPEMS 6 may be configured to verify additional or alternative details about the one or more articles of PPE worn by worker 10A that worker 10A may not typically consider. For example, PPEMS 6 may determine the size and/or training history of the one or more articles of PPE worn by worker 10A in the image. In turn, PPEMS 6 may help ensure that worker 10A is equipped with the one or more articles of PPE 13A required for a job function and/or within environment 8B, and that worker 10A is wearing one or more articles of PPE that are the proper size, that worker 10A has been trained to use, or the like, which may improve the safety, health, accountability, and/or compliance of worker 10A.

In some examples, PPEMS 6 integrates a processing platform configured to process thousand or even millions of concurrent streams of compliance and/or verification information from one or more access points 14. An underlying analytics engine of PPEMS 6 may apply historical data and models to the inbound streams to compute confidence levels, identify trends or patterns, apply machine learning algorithms, or the like. PPEMS 6 may also be configured to process streams of information relating to environments 8, such as, for example, environmental conditions and/or safety events of environments 8. Further, PPEMS 6 may provide real-time alerting and reporting to notify workers 10 and/or users 20, 24 of any compliance errors, verification information, low confidence levels, anomalous conditions of environments 8, or the like.

In this way, PPEMS 6 tightly integrates comprehensive tools for managing PPE compliance with an underlying analytics engine and communication system to provide data acquisition, monitoring, activity logging, reporting, behavior analytics, and/or alert generation. Moreover, PPEMS 6 provides a communication system for operation and utilization by and between the various elements of system 2. Users 20, 24 may access PPEMS to view results on any analytics performed by PPEMS 6 on data acquired from workers 10, camera 22, and/or another component as described herein. In some examples, PPEMS 6 may present a web-based interface via a web server (e.g., an HTTP server) or client-side applications may be deployed for devices of computing devices 16, 18 used by users 20, 24, such as desktop computers, laptop computers, mobile devices, such as smartphones and tablets, or the like.

In some examples, PPEMS 6 may provide a database query engine for directly querying PPEMS 6 to view acquired information, such as compliance information, and any results of the analytic engine, e.g., by the way of dashboards, alert notifications, reports, or the like. That is, users 20, 24, or software executing on computing devices 16, 18, may submit queries to PPEMS 6 and receive data corresponding to the queries for presentation in the form of one or more reports or dashboards. Such dashboards may provide various insights regarding system 2, such as compliance of workers 10, auditing information, images of workers 10, preparedness of workers 10, or the like.

PPEMS 6 may simplify workflows for individuals charged with monitoring and ensure safety compliance for an entity or environment by putting worker 10A in control of his or her own PPE compliance. That is, the techniques of this disclosure may enable worker 10A to take preventative or corrective actions with respect to PPE compliance on his or her own accord rather than relying on another individual directly monitoring and/or verifying the PPE compliance of worker 10A at access point 14B. PPEMS 6 may also enable users 20, 24 to access data and information relating to the PPE compliance and/or preparedness of workers 10.

As one example, the underlying analytical engine of PPEMS 6 may be configured to compute and present customer-defined metrics for worker populations that interact with access point 14B and/or across multiple access points 14 or environments 8 for an organization. For example, PPEMS 6 may be configured to acquire data and provide aggregated compliance metrics and predicted behavior analytics across a worker population (e.g., across workers 10 of access points 14 and/or environments 8). Furthermore, users 20, 24 may set benchmarks for occurrence of any PPE non-compliance, and PPEMS 6 may track actual compliance metrics relative to the benchmarks for individuals or defined worker populations.

As another example, PPEMS 6 may trigger an alert if one or more PPE non-compliant metrics are detected. In this manner, PPEMS 6 may identify individual workers 10 for which the metrics do not meet the benchmarks and prompt users 20, 24 to intervene and/or perform procedures to improve the metrics relative to the benchmarks, thereby ensuring PPE compliance and actively managing safety of workers 10.

Figure 2:
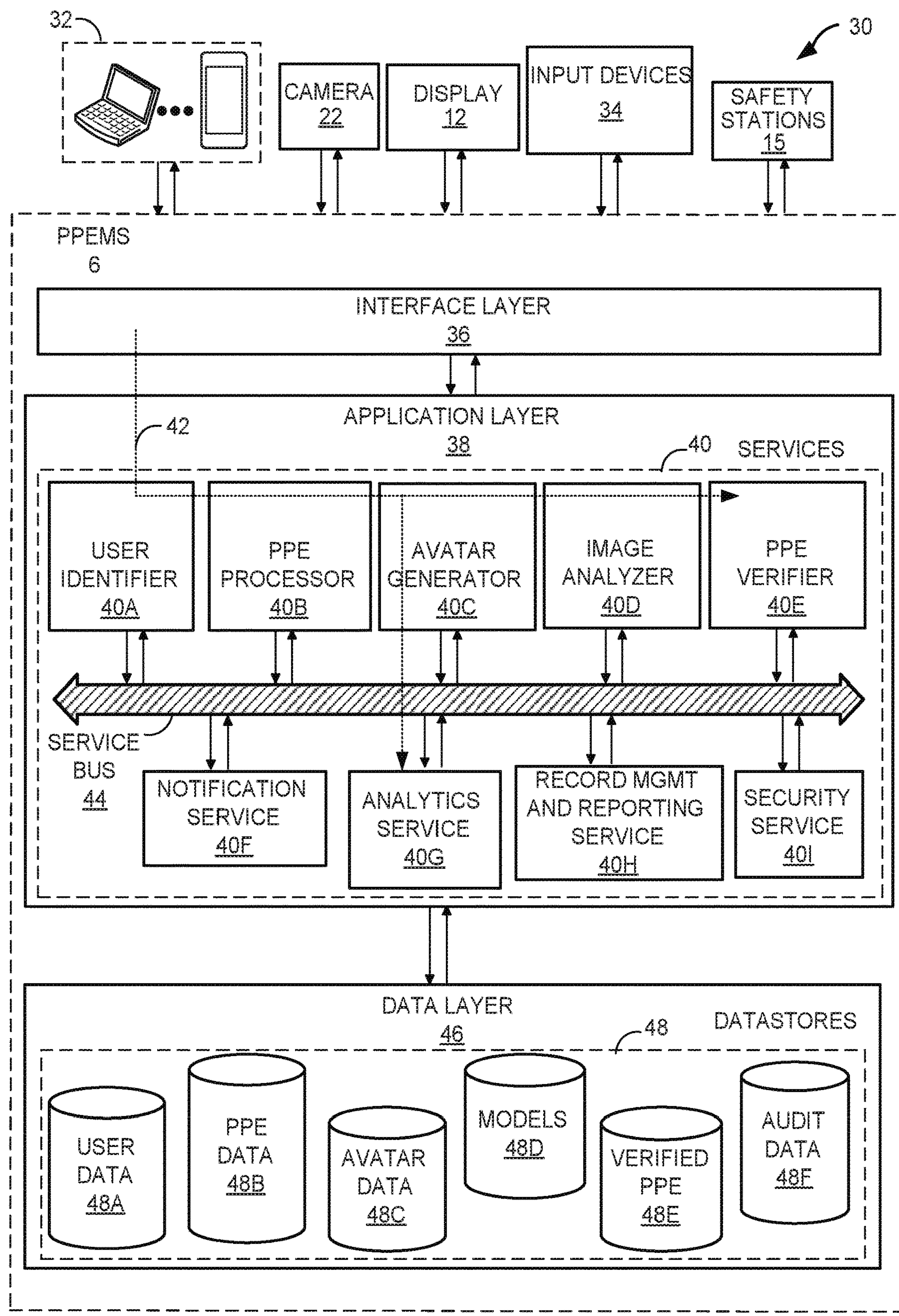
FIG. 2 is a block diagram providing an operating perspective of PPEMS when hosted as a cloud-based platform capable of supporting multiple, distinct access points and/or work environments having an overall population of workers that are required to wear one or more articles of PPE.

FIG. 2 is a block diagram providing an operating perspective of PPEMS 6 when hosted as a cloud-based platform capable of supporting multiple, distinct access points 14 and/or work environments 8 having an overall population of workers 10 that are required to wear one or more articles of PPE. In the example of FIG. 2, the components of PPEMS 6 are arranged according to multiple logical layers that implement the techniques of the disclosure. Each layer may be implemented by one or more modules and may include hardware, software, or a combination of hardware and software.

In some example approaches, computing devices 32, display 12, input devices 34, and/or safety stations 15 operate as clients 30 that communicate with PPEMS 6 via interface layer 36. Computing devices 32 typically execute client software applications, such as desktop applications, mobile applications, and/or web applications. Computing devices 32 may represent any of computing devices 16, 18 of FIG. 1. Examples of computing devices 32 may include, but are not limited to, a portable or mobile computing device (e.g., smartphone, wearable computing device, tablet), laptop computers, desktop computers, smart television platforms, and/or servers.

In some example approaches, computing devices 32, display 12, cameras 22, input devices 34 and/or safety stations 15 may communicate with PPEMS 6 to send and receive information related to articles of PPE identified for a worker, and for avatar generation, PPE verification, alert generation, or the like. Client applications executing on computing devices 32 may communicate with PPEMS 6 to send and receive information that is retrieved, stored, generated, and/or otherwise processed by services 40. For example, the client applications may request and edit PPE compliance information, avatars, PPE training and/or sizing information, or any other information described herein including analytical data stored at and/or managed by PPEMS 6. In some examples, client applications may request information generated by PPEMS 6, such as an image of a worker equipped with one or more identified articles of PPE and/or verification of one or more articles of PPE worn by worker 10A in an image. In addition, the client applications may interact with PPEMS 6 to query for analytics information about PPE compliance, behavior trends of workers 10, audit information, or the like. The client applications may output for display information received from PPEMS 6 to visualize such information for users of clients 30. As further illustrated and described below, PPEMS 6 may provide information to the client applications, which the client applications output for display in user interfaces.

Client applications executing on computing devices 32 may be implemented for different platforms but include similar or the same functionality. For instance, a client application may be a desktop application compiled to run on a desktop operating system, such as Microsoft Windows, Apple OS X, or Linux, to name only a few examples. As another example, a client application may be a mobile application compiled to run on a mobile operating system, such as Google Android, Apple iOS, Microsoft Windows Mobile, or BlackBerry OS to name only a few examples. As another example, a client application may be a web application such as a web browser that displays web pages received from PPEMS 6. In the example of a web application, PPEMS 6 may receive requests from the web application (e.g., the web browser), process the requests, and send one or more responses back to the web application. In this way, the collection of web pages, the client-side processing web application, and the server-side processing performed by PPEMS 6 collectively provides the functionality to perform techniques of this disclosure. In this way, client applications use various services of PPEMS 6 in accordance with techniques of this disclosure, and the applications may operate within different computing environments (e.g., a desktop operating system, mobile operating system, web browser, or other processors or processing circuitry, to name only a few examples).

As shown in FIG. 2, in some example approaches, PPEMS 6 includes an interface layer 36 that represents a set of application programming interfaces (API) or protocol interface presented and supported by PPEMS 6. Interface layer 36 initially receives messages from any of clients 30 for further processing at PPEMS 6. Interface layer 36 may therefore provide one or more interfaces that are available to client applications executing on clients 30. In some examples, the interfaces may be application programming interfaces (APIs) that are accessible over network 4. In some example approaches, interface layer 36 may be implemented with one or more web servers. The one or more web servers may receive incoming requests, may process, and/or may forward information from the requests to services 40, and may provide one or more responses, based on information received from services 40, to the client application that initially sent the request. In some examples, the one or more web servers that implement interface layer 36 may include a runtime environment to deploy program logic that provides the one or more interfaces. As further described below, each service may provide a group of one or more interfaces that are accessible via interface layer 36.

In some examples, interface layer 36 may provide Representational State Transfer (RESTful) interfaces that use HTTP methods to interact with services and manipulate resources of PPEMS 6. In such examples, services 40 may generate JavaScript Object Notation (JSON) messages that interface layer 36 sends back to the client application that submitted the initial request. In some examples, interface layer 36 provides web services using Simple Object Access Protocol (SOAP) to process requests from client applications. In still other examples, interface layer 36 may use Remote Procedure Calls (RPC) to process requests from clients 30. Upon receiving a request from a client application to use one or more services 40, interface layer 36 sends the information to application layer 38, which includes services 40.

As shown in FIG. 2, PPEMS 6 also includes an application layer 38 that represents a collection of services for implementing much of the underlying operations of PPEMS 6. Application layer 38 receives information included in requests received from client applications that are forwarded by interface layer 36 and processes the information received according to one or more of services 40 invoked by the requests. Application layer 38 may be implemented as one or more discrete software services executing on one or more application servers, e.g., physical or virtual machines. That is, the application servers provide runtime environments for execution of services 40. In some examples, the functionality of interface layer 36 as described above and the functionality of application layer 38 may be implemented at the same server.

Application layer 38 may include one or more separate software services 40 (e.g., processes) that may communicate via, for example, a logical service bus 44. Service bus 44 generally represents a logical interconnection or set of interfaces that allows different services to send messages to other services, such as by a publish/subscription communication model. For example, each of services 40 may subscribe to specific types of messages based on criteria set for the respective service. When a service publishes a message of a particular type on service bus 44, other services that subscribe to messages of that type will receive the message. In this way, each of services 40 may communicate information to one another. As another example, services 40 may communicate in point-to-point fashion using sockets or other communication mechanism. Before describing the functionality of each of services 40, the layers are briefly described herein.

Data layer 46 may include one or more datastores 48. A datastore may store data in structured or unstructured form. Example datastores may be any one or more of a relational database management system, online analytical processing database, map, table, hash table or any other suitable structure for storing data. In one example approach, data layer 46 of PPEMS 6 includes datastores 48 used to provide persistence for information in PPEMS 6. Data layer 46 may be implemented, for instance, using Relational Database Management System (RDBMS) software to manage information in datastores 48. The RDBMS software may manage one or more datastores 48, which may be accessed using Structured Query Language (SQL). Information in the one or more databases may be stored, retrieved, and modified using the RDBMS software. In some examples, data layer 46 may be implemented using an Object Database Management System (ODBMS), Online Analytical Processing (OLAP) database, or any other suitable data management system.

As shown in FIG. 2, each of services 40A-40I is implemented in a modular form within PPEMS 6. Although shown as separate modules for each service, in some examples the functionality of two or more services may be combined into a single module or component. Each of services 40 may be implemented in software, hardware, or a combination of hardware and software. Moreover, services 40 may be implemented as standalone devices, separate virtual machines or containers, processes, threads, or software instructions generally for execution on one or more physical processors or processing circuitry.

In some examples, one or more of services 40 may each provide one or more interfaces 42 that are exposed through interface layer 36. Accordingly, client applications of computing devices 32 may call one or more interfaces 42 of one or more of services 40 to perform techniques of this disclosure.

In some cases, services 40 include a user identifier service 40A used to identify a worker 10A at access point 14B. For example, user identifier service 40A may receive identification information from a client 30, such as an input device 34, and may read information stored in user datastore 48A to identify worker 10A based on the identification information. In some examples, user datastore 48A may include identification information including at least one of what worker 10A knows (e.g., an identification number password or username), what worker 10A has (e.g., an identity card or token) and what the user is (a physical characteristic of worker 10 A such as biometric information, photo recognition information, or voice recognition information of worker 10A). User identifier 40A may receive at least one of such identification information and may read user datastore 48A to identify worker 10A based on the received identification information.

In some examples, user identifier 40A may process the received identification information to include identification information in the same form as the identification information stored in user datastore 48A. For example, user identifier 40A may analyze an image, a retina, a fingerprint, and/or a voice recording of worker 10A to extract data and/or information from the identification information that is included in user datastore 48A. As one example, user identifier 40A may extract data representative of a pattern of a fingerprint of worker 10A to compare to data stored in user datastore 48A.

PPE processor 40B identifies the one or more articles of PPE 13A for worker 10A to use. For example, as described herein, PPE processor 40B may identify the one or more articles of PPE 13A for worker 10A to use based on an identity of worker 10A, such as based on a job function of worker 10A, environment 8B, based on one or more articles of PPE that worker 10A is trained to use, based on one or more previously worn articles of PPE (e.g., one or more of articles of PPE previously worn by worker 10A, previously worn within environment 8B, or previously worn for a specific job function), or the like. PPE processor 40B may read such information from PPE datastore 48B. For example, PPE datastore 48B may include data relating to PPE required for various job functions, PPE required for various environments 8, articles of PPE that various workers 10 have been trained to use, and/or PPE previously worn for a job function, in an environment 8, or by a worker 10A. PPE datastore 48B may also include information pertaining to various sizes of one or more articles of PPE for workers 10. For example, PPE datastore 48B may include the brand, model, and/or size of one or more articles of PPE for workers 10 based on fit testing of workers 10. In some examples, in addition to, or as an alternative to, PPE datastore 48B, user datastore 48A may include information regarding a job function of worker 10A, environment 8B within which worker 10A is to work, PPE previously worn by worker 10A, fit testing data of worker 10A, or the like.

PPE processor 40B may further create, update, and/or delete information stored in PPE datastore 48B and/or in user datastore 48A. For example, PPE processor 40B may update PPE datastore 48B or user datastore 48A after a worker 10 undergoes training for one or more articles of PPE, or PPE processor 40B may delete information in PPE datastore 48B or in user datastore 48A if a worker 10 has outdated training on one or more articles of PPE. In other examples, PPE processor 40B may create, update, and/or delete information stored in PPE datastore 48B and/or in user datastore 48A due to additional or alternative reasons.

Moreover, in some examples, such as in the example of FIG. 2, a safety manager may initially configure one or more safety rules pertaining to articles of PPE that workers 10 should use. As such, remote user 24 may provide one or more user inputs at computing device 18 that configure a set of safety rules relating to articles of PPE. For example, a computing device 32 of the safety manager may send a message that defines or specifies the one or more articles of PPE required for a specific job function, for a specific environment 8, for a specific worker 10A, or the like. Such messages may include data to select or create conditions and actions of the safety rules. PPEMS 6 may receive the message at interface layer 36 which forwards the message to PPE processor 40B, which may additionally be configured to provide a user interface to specify conditions and actions of rules, receive, organize, store, and update rules included in PPE datastore 48B, such as safety rules relating to PPE that workers 10 should use in various cases.

In some examples, storing the safety rules may include associating a safety rule with context data, such that PPE processor 40B may perform a lookup to select safety rules associated with matching context data. Context data may include any data describing or characterizing the properties or operation of a worker, worker environment, article of PPE, or any other entity. Context data of a worker may include, but is not limited to, a unique identifier of a worker, type of worker, role of worker, physiological or biometric properties of a worker, experience of a worker, training of a worker, time worked by a worker over a particular time interval, location of the worker, or any other data that describes or characterizes a worker. Context data of an article of PPE 13 may include, but is not limited to, a unique identifier of the article of PPE; a type of PPE of the article of PPE; a usage time of the article of PPE over a particular time interval; a lifetime of the PPE; a component included within the article of PPE; a usage history across multiple users of the article of PPE; contaminants, hazards, or other physical conditions detected by the PPE, expiration date of the article of PPE; operating metrics of the article of PPE; size of the PPE; or any other data that describes or characterizes an article of PPE. Context data for a work environment may include, but is not limited to, a location of a work environment, a boundary or perimeter of a work environment, an area of a work environment, hazards within a work environment, physical conditions of a work environment, permits for a work environment, equipment within a work environment, owner of a work environment, responsible supervisor and/or safety manager for a work environment; or any other data that describes or characterizes a work environment. In some examples, the context data may be the same, or close to the same, as the information used to identify the one or more articles of PPE for worker 10A to use.

Avatar generator 40C generates an image 23 of worker 10A equipped with the one or more articles of PPE 13 identified for worker 10A to use by PPE processor 40B. Avatar generator 40C may read information from avatar datastore 48C and/or from user datastore 48A to display the image 23 of worker 10A. For example, avatar datastore 48C may include previously stored avatars of worker 10A and/or other workers 10, and user datastore 48A may include one or more images of worker 10A. Thus, avatar generator 40C may be able to access a previously stored avatar from avatar datastore 48C and/or one or more images of worker 10A from user datastore 48A, which may enable avatar generator 40C to display the avatar of worker 10A using a previously stored avatar, by modifying a previously stored avatar, and/or by rendering a new avatar of worker 10A (e.g., using the one or more images of worker 10A). Additionally, or alternatively, avatar generator 40C may receive one or more images of worker 10 from camera 22 and may use the one or more captured images to display the image 23 of worker 10A. In some cases, avatar generator 40C may display a moving avatar of worker 10A.

Avatar generator 40C also equips the image 23 of worker 10A with the one or more articles of PPE 13A identified for worker 10A to use by PPE processor 40B. In some examples, avatar datastore 48C may include one or more stored articles of PPE such that avatar generator 40C does not have to render new articles of PPE to equip the image with. In other examples, avatar generator may have to render one or more articles of PPE from scratch to equip the image with the proper one or more articles of PPE as identified by PPE processor 40B.

In some examples, information stored in user datastore 48A and/or in avatar datastore 48C may include information relating to at least one of hair color, eye color, height, weight, facial features, skin tone, or attire of workers 10. In this way, avatar generator 40C may be able to read such information and display an avatar that resembles worker 10A in at least one of hair color, eye color, height, weight, facial features, skin tone, or attire. Additionally, or alternatively, image analyzer 40D may be able to analyze one or more images of worker 10A to identify such information. In such examples, image analyzer 40D may store the information in user datastore 48A and/or in avatar datastore 48C. As described above, avatar generator 40C may display a cartoon version of worker 10A rather than including actual images of worker 10A, such as to maintain the privacy of worker 10A.

Avatar generator 40C may include the image 23 of worker 10A equipped with the one or more articles of PPE 13 in a user interface and may send the user interface to display 12 for presentation to worker 10A as shown in FIG. 1. Moreover, avatar generator 40C may further create, update, and/or delete information stored in user datastore 48A and/or in avatar datastore 48C. For example, avatar generator 40C may update user datastore 48A and/or avatar datastore 48C to include a captured image, a rendered avatar, and/or one or more rendered articles of PPE. In other examples, avatar generator 40C may create, update, and/or delete information stored in user datastore 48A and/or in avatar datastore 48C to include additional and/or alternative information.

Image analyzer 40D analyzes images of workers 10. For example, image analyzer 40D may analyze one or more images of worker 10A such that avatar generator 40C can display an image of worker 10A based on the one or more images. In another example, image analyzer 40D may analyze one or more images of worker 10A and generate a three-dimensional model of all or a portion of worker 10A. The model may be stored, for instance, in models datastore 48D. In one such example, three-dimensional models of PPEs are also stored in models datastore 48D.

As another example, image analyzer 40D may receive one or more images of worker 10A from camera 22 to identify one or more articles of PPE worn by worker 10A in the one or more images. In some examples, image analyzer 40D may access data relating to features of workers 10 and/or articles of PPE from user datastore 48A and/or from PPE datastore 48B. In such examples, image analyzer 40D may analyze received images to look for such features of workers 10 and/or articles of PPE in the received images. Image analyzer 40D may compare features found in the one or more analyzed images to the features indicated in user datastore 48A and/or in PPE datastore 48B to identify a worker 10, identify an article of PPE worn by a worker 10 in the image, or the like.

Image analyzer 40D may also be able to identify details about a worker 10 and/or an article of PPE worn by the worker 10 in the image from the one or more images. For example, image analyzer 40D may be able to identify a brand, a model, a size, or the like of an article of PPE worn by the worker 10 in the one or more analyzed images and/or identify at least one of hair color, eye color, height, weight, facial features, skin tone, or attire of a worker 10 in the one or more images. The identified details may be saved in at least one of user datastore 48A or PPE datastore 48B, may be sent to avatar generator 40C for display of an avatar including the identified details, may be sent to PPE verifier 40E for verification of the one or more articles of PPE worn by worker 10A in the one or more images, or combinations thereof. Image analyzer 40D may further create, update, and/or delete information stored in user datastore 48A and/or in PPE datastore 48B.

The one or more articles of PPE identified as being worn by worker 10A in an image may be used by PPE verifier 40E to verify that worker 10A is equipped with the proper PPE (e.g., the same one or more articles of PPE identified for worker 10A to use by PPE processor 40B). In some examples, PPE verifier 40E may compare the one or more articles of PPE worn by worker 10A in the image (e.g., as identified by image analyzer 40D) and the one or more articles of PPE for worker 10A to use (e.g., as identified by PPE processor 40B). Based on the comparison, PPE verifier 40E may determine whether worker 10A is wearing all required articles of PPE, whether the articles of PPE worn by worker 10A in the image are the proper size for worker 10A, whether worker 10A is trained to use the articles of PPE worn by worker 10A in the image, or the like.

In some examples, PPE verifier 40E may modify the avatar of worker 10A displayed by avatar generator 40C to highlight or otherwise indicate one or more errors with respect to the one or more articles of PPE worn by worker 10A in the image. In some cases, PPE verifier 40E may highlight or otherwise indicate one or more articles of PPE that are not present in the one or more articles of PPE worn by worker 10A in the image, that are the incorrect size for worker 10A, that worker 10A is not trained to use, or combinations thereof. In some such examples, PPE verifier 40E may be configured to generate a user interface including the modified image of the worker. PPE verifier 40E may highlight or otherwise indicate different errors in different ways such that worker 10A can differentiate between errors when two or more types of errors are present. For example, PPE verifier 40E may highlight a missing article of PPE in a first color or pattern, may highlight an article of PPE that is incorrect in size using a second color or pattern, may highlight an article of PPE that worker 10A has not been trained to use using a third color or pattern. In other examples, indications other than colored and/or patterned highlighted articles of PPE may be used to indicate the one or more errors of the articles of PPE worn by worker 10A in the image. Determination of an error with respect to the one or more articles of PPE worn by worker 10A in the image may result in notification service 40F generating an alert indicating the error in addition to, or as an alternative to, PPE verifier 40D modifying the displayed image of worker 10A to indicate the error.

Additionally, or alternatively, PPE verifier 40E may receive confirmation of one or more articles of PPE from input devices 34. In some cases, worker 10A may be able to confirm that he or she is wearing the one or more articles of PPE identified by PPE processor 40B and equipped by the avatar displayed by avatar generator 40C. Thus, in some examples, PPE verifier 40E may receive the confirmation, and may provide an indication of the received confirmation. For example, PPE verifier 40E may highlight the one or more confirmed articles of PPE in a user interface including the image 23 with the highlighted articles for display using display 12. In other examples, PPE verifier 40E may present an indication of the received confirmation in a different way. As one example, PPE verifier 40E may use notification service 40F to present an alert indicating confirmation of the one or more articles of PPE. As another example, a user interface indicating the received confirmation may include a list of the one or more articles of PPE that the image is equipped with (e.g., the one or more articles of PPE identified for worker 10A to use by PPE processor 40B), and PPE verifier 40E may check one or more articles of PPE off on the list based on the received confirmations. Moreover, in some examples, PPE verifier 40E may indicate a lack of confirmation of one or more articles of PPE. For example, PPE verifier 40E may highlight or otherwise indicate any non-confirmed articles of PPE out of the one or more articles of PPE identified for worker 10A to use by PPE processor 40B.

In some examples, PPE verifier 40E may read, create, update, and/or delete information stored in verified PPE datastore 48E. For example, verified PPE datastore 48E may include the PPE identified as worn by worker 10A in an image by image analyzer 40D, one or more images modified to indicate missing and/or incorrect articles of PPE worn by worker 10A in the image, one or more captured images of worker 10A used to verify the one or more articles of PPE worn by worker 10A in the image, or the like. In other examples, the data that would be stored in verified PPE datastore 48E may be stored in one or more other data stores. For example, identified PPE data may be stored in PPE datastore 48B and/or in user datastore 48A.

In some examples, analytics service 40G performs in depth processing of the one or more identified articles of PPE for workers 10, one or more images, one or more articles of PPE identified as worn by a worker in an image, or the like. Such in depth processing may enable analytics service 40G to determine PPE compliance of workers 10, such as PPE compliance for workers entering environment 8 via a specific access point 14, PPE compliance of individual workers 10, more accurately identify the one or more articles of PPE worn by worker 10A in images, or the like.

In some cases, analytics service 40G performs in depth processing in real-time to provide real-time alerting and/or reporting. In this way, analytics service 40G may be configured as an active safety management system that provides real-time alerting and reporting to a safety manager, a supervisor, or the like in the case of PPE non-compliance of a worker 10. This may enable the safety manager and/or supervisor to intervene in the PPE non-compliance of the worker 10 such that worker 10 is not at risk for harm, injury, health complications, or combinations thereof due to a lack of PPE compliance.

In addition, analytics service 40G may include a decision support system that provides techniques for processing data to generate assertions in the form of statistics, conclusions, and/or recommendations. For example, analytics service 40G may apply historical data and/or models stored in models datastore 48D to determine the accuracy of the one or more articles of PPE worn by worker 10A in the image determined by image analyzer 40D. In some such examples, analytics service 40G may calculate a confidence level relating to the identification accuracy of one or more articles of PPE worn by worker 10A in the image. As one example, in the case in which lighting conditions of access point 14B may be reduced, the confidence level calculated by analytics service 40G may be lower than a confidence level calculated when lighting conditions are not reduced. If the calculated confidence level is less than or equal to a threshold confidence level, notification service 40F may present an alert on display 12 to notify worker 10A that the results of the PPE verification may not be completely accurate. Hence, analytics service 40G may maintain or otherwise use one or more models that provide statistical assessments of the accuracy of the identification of the one or more articles of PPE required and/or worn by a worker in an image. In one example approach, such models are stored in models datastore 48D.

Analytics service 40G may also generate order sets, recommendations, and quality measures. In some examples, analytics service 40G may generate user interfaces based on processing information stored by PPEMS 6 to provide actionable information to any of clients 30. For example, analytics service 40G may generate dashboards, alert notifications, reports and the like for output at any of clients 30. Such information may provide various insights regarding baseline ("normal") PPE compliance across worker populations, identifications of any anomalous workers engaging in PPE non-compliance that may potentially expose the worker to risks, identifications of any of access points 14B exhibiting anomalous occurrences of PPE non-compliance relative to other environments, or the like.

Moreover, in addition to non-compliance, analytics service 40G may use in depth process to more accurately identify and/or verify the one or more articles of PPE. For example, although other technologies can be used, analytics service 40G may utilize machine learning when processing data in depth. That is, analytics service 40G may include executable code generated by application of machine learning to PPE identification, image analyzing, PPE verification, PPE compliance, or the like. The executable code may take the form of software instructions or rule sets and is generally referred to as a model that can subsequently be applied to data generated by or received by PPEMS 6 for detecting similar patterns, identifying the one or more articles of PPE, analyzing images, verifying the one or more articles of PPE, or the like.

Analytics service 40G may, in some examples, generate separate models for each worker 10A, for a particular population of workers 10, for a particular access point 14, for a combination of one or more articles of PPE, for a type of PPE, for a brand, model, and/or size of PPE, for a specific job function, or for combinations thereof, and store the models in models datastore 48D. Analytics service 40G may update the models based on PPE compliance data, images, and/or PPE verification. For example, analytics service 40G may update the models for each worker 10A, for a particular population of workers 10, for a particular access point 14, for a combination of one or more articles of PPE, for a type of PPE, for a brand, model, and/or size of PPE, for a specific job function, or for combinations thereof based on data received from camera 22, input devices 34, and/or any other component of PPEMS 6, and may store the updated models in models datastore 48D. Analytics service 40G may also update the models based on statistical analysis performed, such as the calculation of confidence intervals, and may store the updated models in models datastore 48D.

Example machine learning techniques that may be employed to generate models can include various learning styles, such as supervised learning, unsupervised learning, and semi-supervised learning. Example types of algorithms include Bayesian algorithms, Clustering algorithms, decision-tree algorithms, regularization algorithms, regression algorithms, instance-based algorithms, artificial neural network algorithms, deep learning algorithms, dimensionality reduction algorithms, or the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbor (kNN), Learning Vector Quantization (LUQ), Self-Organizing Map (SOM), Locally Weighted Learning (LWL), Ridge Regression, Least Absolute Shrinkage and Selection Operator (LASSO), Elastic Net, Least-Angle Regression (LARS), Principal Component Analysis (PCA), and/or Principal Component Regression (PCR).

In some examples, analytics service 40G may provide comparative ratings of PPE compliance of workers 10. For example, analytics service 40G may "gamify" the PPE compliance of workers 10. In other words, in some cases, analytics service 40G may reward points to workers 10 for PPE compliance, which may increase worker morale and/or increase the desire of workers 10 to comply with PPE policies and regulations.

Record management and reporting service 40H processes and responds to messages and queries received from computing devices 32 via interface layer 36. For example, record management and reporting service 40H may receive requests from client computing devices for event data related to individual workers, populations or sample sets of workers, and/or access points 14. In response, record management and reporting service 40H accesses information based on the request. Upon retrieving the data, record management and reporting service 40H constructs an output response to the client application that initially requested the information. In some examples, the data may be included in a document, such as an HTML document, or the data may be encoded in a JSON format or presented by a dashboard application executing on the requesting client computing device.

As additional examples, record management and reporting service 40H may receive requests to find, analyze, and correlate PPE compliance information. For instance, record management and reporting service 40H may receive a query request from a client application for verified PPE stored in datastore 48E over a historical time frame, such that a user can view PPE compliance information over a time and/or a computing device can analyze the PPE compliance information over time.

In some examples, services 40 may also include security service 40I that authenticates and authorizes users and requests with PPEMS 6. Specifically, security service 40I may receive authentication requests from client applications and/or other services 40 to access data in data layer 46 and/or perform processing in application layer 38. An authentication request may include credentials, such as a username and password. Security service 40I may query user datastore 48A to determine whether the username and password combination is valid. User datastore 48A may include security data in the form of authorization credentials, policies, and any other information for controlling access to PPEMS 6. As described above, user datastore 48A may include authorization credentials, such as combinations of valid usernames and passwords for authorized users of PPEMS 6. Other credentials may include device identifiers or device profiles that can access PPEMS 6.

Security service 40I may provide audit and logging functionality for operations performed at PPEMS 6. For instance, security service 40I may log operations performed by services 40 and/or data accessed by services 40 in data layer 46. Security service 40I may store audit information such as logged operations, accessed data, and rule processing results in audit datastore 48F. In some examples, security service 40I may generate events in response to one or more rules being satisfied. Security service 40I may store data indicating the events in audit datastore 48F.

Although generally described herein as avatars, images, rendered articles of PPE, or any other stored information described herein being stored in datastores 48, in some examples, datastores 48 may additionally or alternatively include data representing such avatars, images, rendered articles of PPE, or any other stored information described herein. As one example, encoded lists, vectors, or the like representing a previously stored avatar may be stored in addition to, or as an alternative, the previously stored avatar itself. In some examples, such data representing avatars, images, rendered articles of PPE, or any other stored information described herein may be simpler to store, evaluate, organize, categorize, or the like in comparison to storage of the actual avatars, images, rendered articles of PPE, or the like.

In general, while certain techniques or functions are described herein as being performed by certain components or modules, it should be understood that the techniques of this disclosure are not limited in this way. That is, certain techniques described herein may be performed by one or more of the components or modules of the described systems. Determinations regarding which components are responsible for performing techniques may be based, for example, on processing costs, financial costs, power consumption, or the like.

Figure 3:
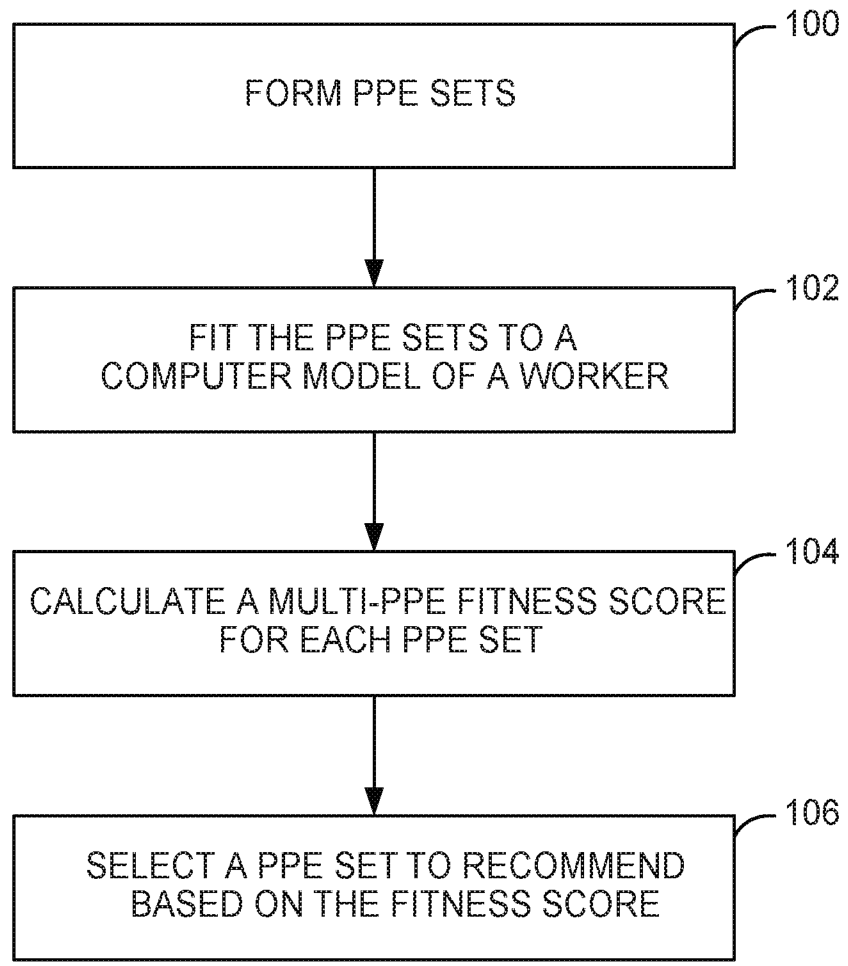
FIG. 3 is a flowchart illustrating a method of simulating a fitting of a PPE set having two or more articles of PPE to a worker, in accordance with one aspect of the present disclosure.

FIG. 3 is a flowchart illustrating a method of simulating a fitting of a PPE set having one or more articles of PPE to a worker, in accordance with one aspect of the present disclosure. In the example approach of FIG. 3, PFE articles 13 are organized as PPE sets, with each PPE set including two or more PPE articles 13 (100). One or more PPE sets are fit to a computer model of the worker (102). A PPE-fit test then determines a fitness score for each PPE set (104) and, in one example approach, selects a PPE set to recommend for the worker 10A based on the fitness score (106). This technique may be used, for example, to automate selection of PPEs based on digital scanning of a user's face and the fitting of a virtual PPE mesh onto the face in a manner that reduces or eliminates collisions between PPEs, so that the PPES can function together.

Figure 4:
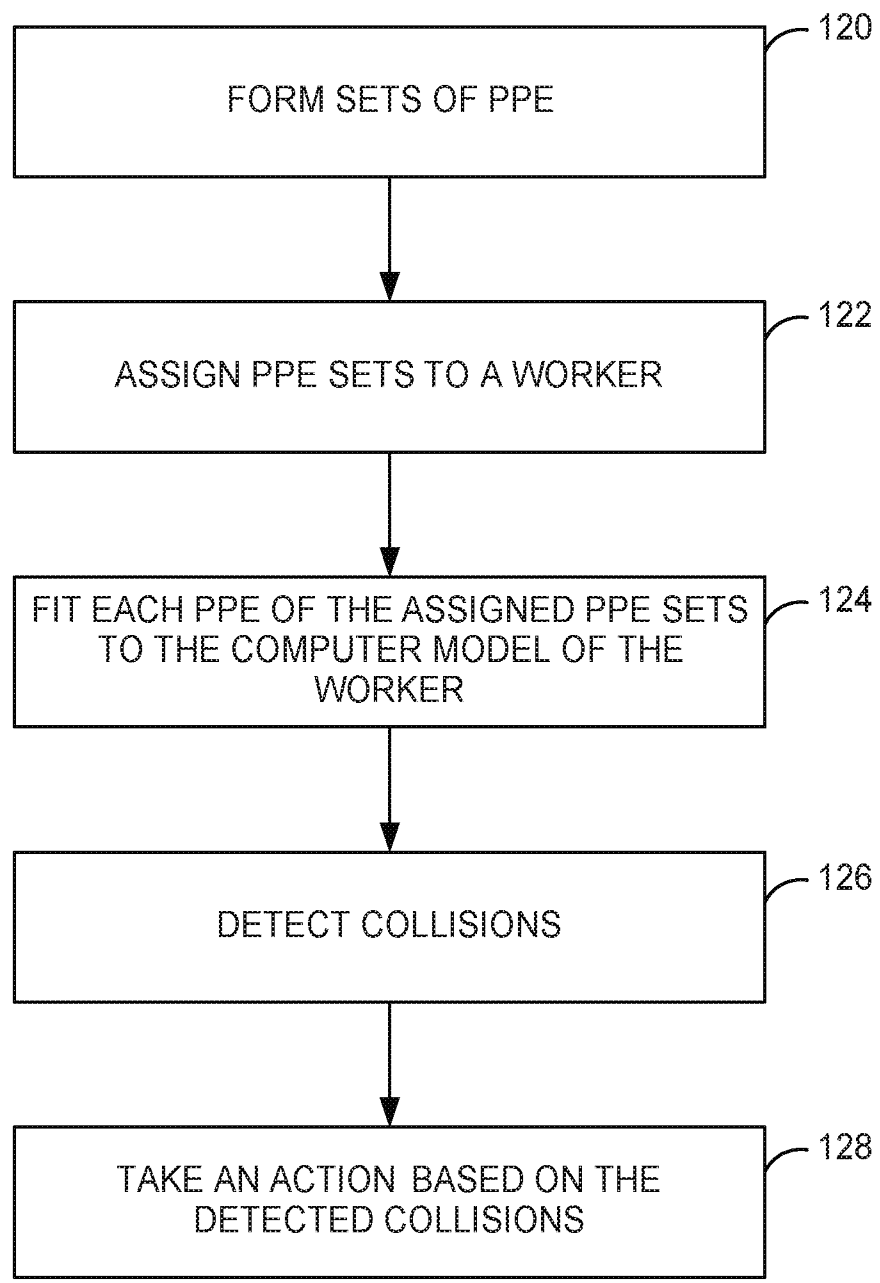
FIG. 4 is a flowchart illustrating another method of simulating a fitting of a PPE set having two or more articles of PPE to a worker, in accordance with one aspect of the present disclosure.

FIG. 4 is a flowchart illustrating another method of simulating a fitting of a PPE set having one or more articles of PPE to a worker, in accordance with one aspect of the present disclosure. In the example approach of FIG. 4, PFE articles 13 are organized as PPE sets, with each PPE set including two or more PPE articles 13 (120). One or more PPE sets are assigned to a worker (122). In one example approach, PPE sets are assigned based on a worker's identity and job function. Other criteria may be used as well, such as whether the worker was trained in the use of a PPE 13. The one or more PPE sets are then fit to a computer model of the worker (124). PPEMS 6 detects collisions between the models (126 and takes one or more actions based on the detected collisions (128). In one example approach, the action is determining, at 128, a multi-PPE fitness score for each PPE set. In another example approach, the action is determining, at 128, a multi-PPE fitness score for each PPE set and recommending a PPE set based on the multi-PPE fitness score. In yet another example approach, the action is adapting or perturbing one or more of the PPE models to remove or reduce collisions.

Figure 5:
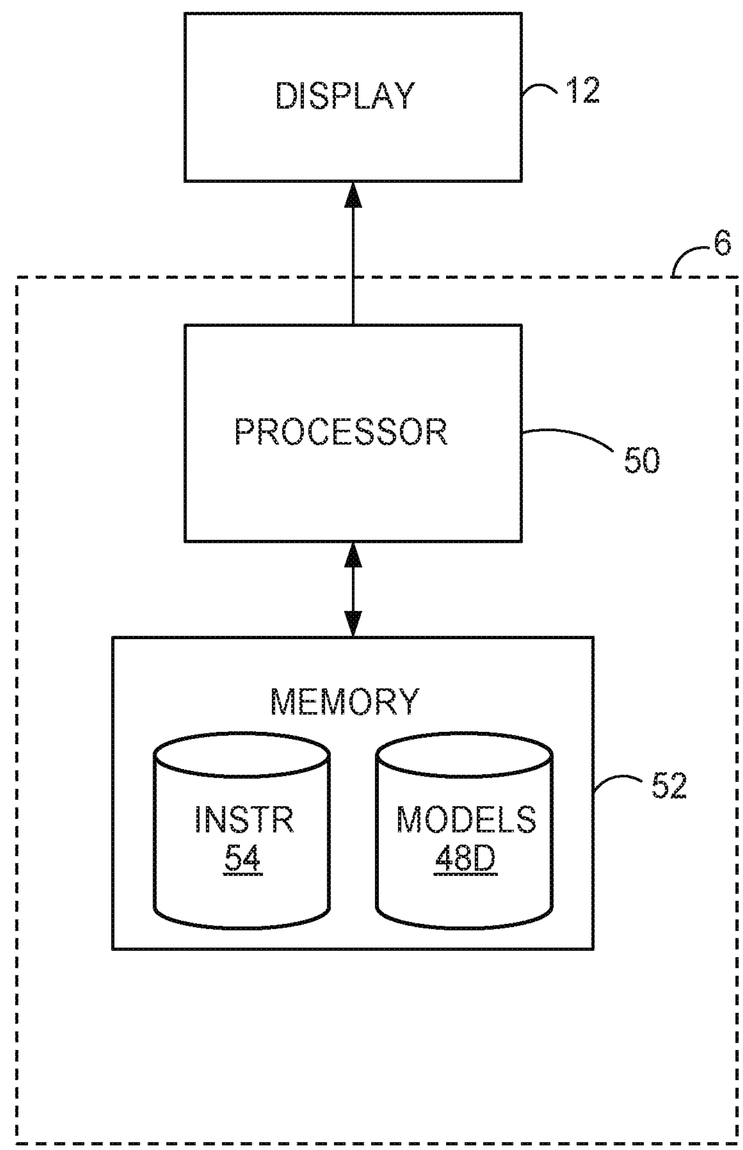
FIG. 5 is a block diagram illustrating a PPEMS connected to a display, in accordance with one aspect of the present disclosure.

FIG. 5 is a block diagram illustrating a PPEMS connected to a display, in accordance with one aspect of the present disclosure. In the block diagram of FIG. 5, PPEMS 6 includes one or more processors 50 connected to a memory 52. Memory 52 includes instructions 54 and models repository 48D. In one example approach, models repository 48D includes three-dimensional computer models of PPEs 13 and of workers 10.

The instructions stored in instructions 54, when executed by the one or more processors 50, cause the PPEMS 6 to identify two or more sets of Personal Protective Equipment (PPE), wherein each of the PPE sets includes at least two or more articles of PPE and fit the PPE articles of the identified one or more PPE sets to the worker. In one example approach, simulating a fitting includes selecting a three-dimensional computer model for each PPE article of the PPE set, obtaining a computer model representing the worker, wherein the computer model representing the worker depicts at least a portion of the worker, determining, for the PPE set being fitted, a placement of the computer model of each of the PPE articles of the PPE set on the computer model representing the worker, and identifying collisions between the computer models as placed. PPEMS 6 then takes an action based on the identified collisions and displays one or more messages reflective of the action on display 12.

In one example approach, the computer model representing the worker is generated by capturing an image of the worker and generating the computer model of the worker based on the captured image. In some example approaches, the image is a three-dimensional scan of the worker or other representation that conveys depth. In some example approaches a three-dimensional model of the worker's face is generated from two or more images. In other example approaches a three-dimensional model of the worker's face is generated from three-dimensional images across a population.

In some example approaches, obtaining a computer model representing the worker includes retrieving, based on the worker's identity, a computer model from a datastore of computer models. In some example approaches, the computer model representing the worker is based images collected across a population of workers.

In one example approach, the computer model of the worker is based on a given work population or is based on an average worker's face or head.

In one example approach, as noted above, the action is determining a multi-PPE fitness score for each PPE set. In another example approach, the action is determining, at 128, a multi-PPE fitness score for each PPE set and recommending a PPE set based on the multi-PPE fitness score. In yet another example approach, the action is adapting or perturbing one or more of the PPE models to remove or reduce collisions.

In one example approach, PPEMS 6 identifies one or more PPE sets to be fitted to worker 10*a*. Each PPE set includes a first article of PPE and a second article of PPE; each article of PPE has an associated three-dimensional computer model. PPEMS 6 then fits the one or more PPE sets identified to the worker.

Figure 6A:
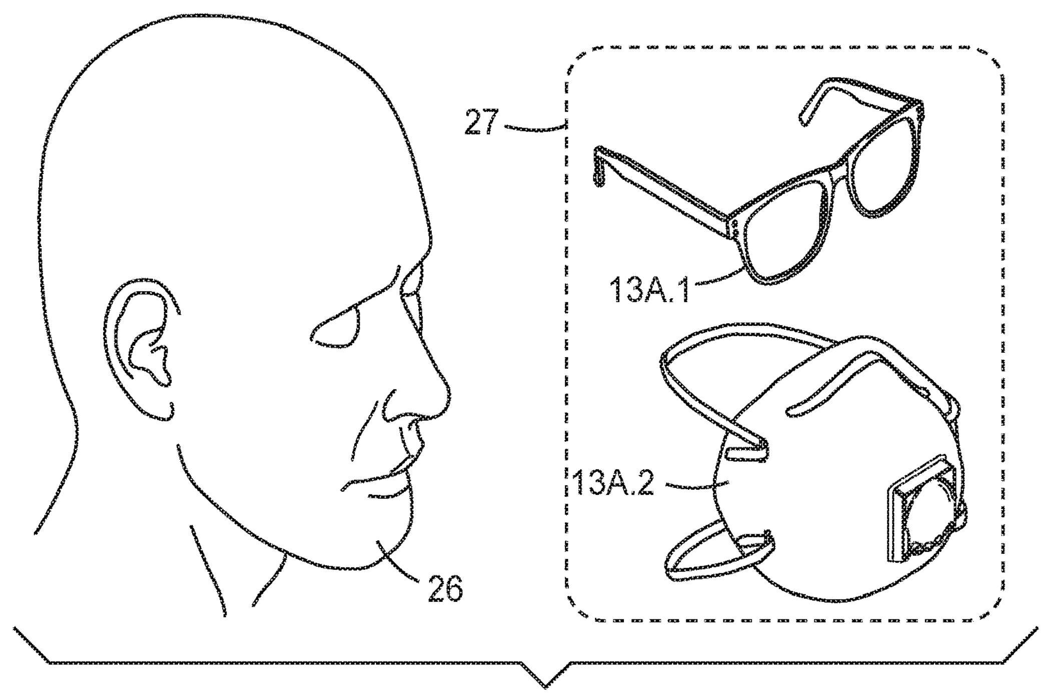
FIGS. 6A-6D illustrate computer models for workers and for PPE sets, in accordance with one or more aspects of the present disclosure.
Figure 6B:
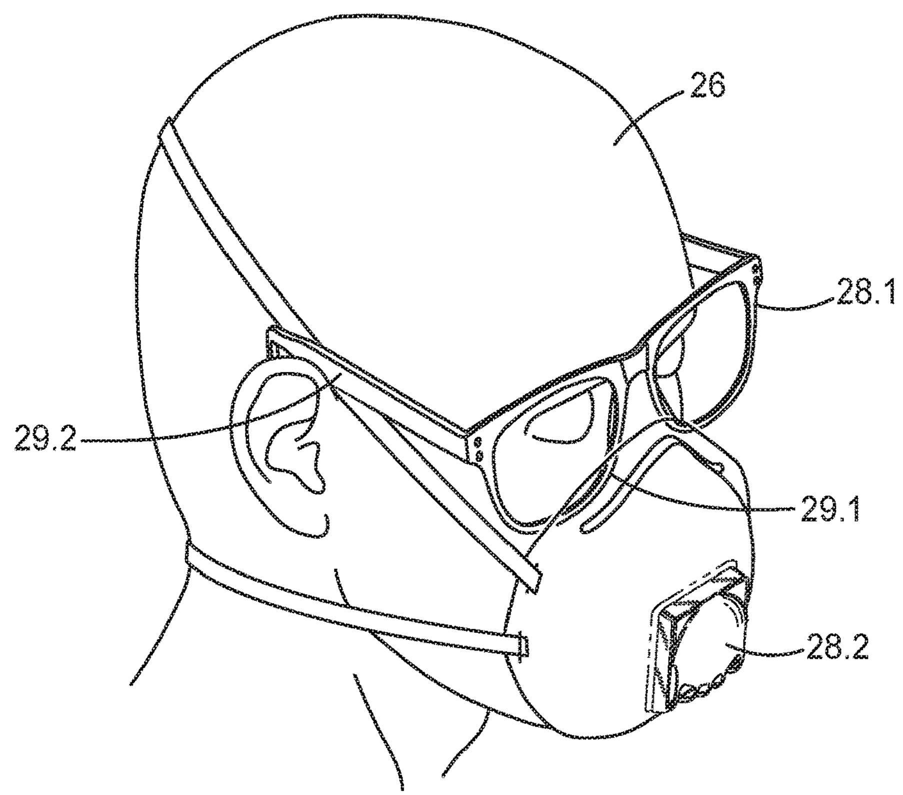

FIGS. 6A-6D illustrate computer models for workers and for PPE sets, in accordance with one or more aspects of the present disclosure. In the example of FIGS. 6A and 6B, a worker 10A is to be fitted with a PPE set 27 having safety glasses 13A.1 and a respirator 13A.2. FIG. 6A illustrates PPE set 27 and a computer model 26 for worker 10A.

As noted above, PPEMS 6 fits PPE set 27 to the worker 10A by placing computer models 28 of the PPEs 13A of PPE set 27 in position on the computer model 26 of the worker 10A, as shown in FIG. 6B. As can be seen in FIG. 6B, the interaction of computer models 26 and 28 can result in collisions 29 between the computer models 28 of the PPEs and between the computer models 28 of the PPEs and the computer model 26 associated with the worker 10A. In the example shown in FIG. 6B, there is a collision 29.1 between the computer model 28.1 of the safety glasses 13A.1 and the computer model 28.2 of the respirator 13A.2 as the respirator model 28.2 passes through the glasses model 28.1. There is also a collision 29.2 between the computer model 28.1 of the safety glasses, the strap of computer model 28.2 of respirator 13.2 and the computer model 26 of the worker in the area around the worker's ears, as each of the models 26, 28.1 and 28.2 all try to occupy the same space. Shifting the positioning of one or more of the PPEs 13A.1 and 13A.2 or bending or otherwise perturbing the model 28 of one or more of the PPEs 13A constrained by the physical attributes of the PPE may resolve the collisions.

In one example approach, PPEMS 6 identifies one or more sets of Personal Protective Equipment (PPE), where each PPE set includes at a pair of safety glasses and a respirator. PPEMS 6 performs a multi-PPE fit test of the identified one or more PPE sets to the worker. In one example approach, the multi-PPE fit test includes, for each of the PPE sets, selecting, for each article of PPE of the PPE set being fitted, an associated three-dimensional computer model 28 of the PPE article, obtaining a computer model 26 representing the worker, wherein the computer model representing the worker depicts at least a portion of the worker, determining, for the PPE set being fitted, an initial placement of the computer model of the first article of PPE on the computer model representing the worker and identifying collisions between the computer model of the first article of PPE and the computer model representing the worker when the computer model of the first article of PPE is placed at the initial placement location of the first article of PPE. The multi-PPE fit test further includes determining, for the PPE set being fitted, an initial placement of the computer model of the second article of PPE on the computer model representing the worker, identifying collisions between the computer model of the second article of PPE and the computer model of the worker when the computer model of the second article of PPE is placed at the initial placement location of the second article of PPE, and identifying collisions between the computer model of the second article of PPE and the computer model of the first article of PPE when the computer model of the second article of PPE is placed at the initial placement location of the second article of PPE. PPEMS then calculates, based on the collisions identified for each article of PPE in the PPE set, a multi-PPE fitness score for each PPE set; and outputs, on the display 12, one or more messages responsive to the multi-PPE fitness scores.

Figure 6C:
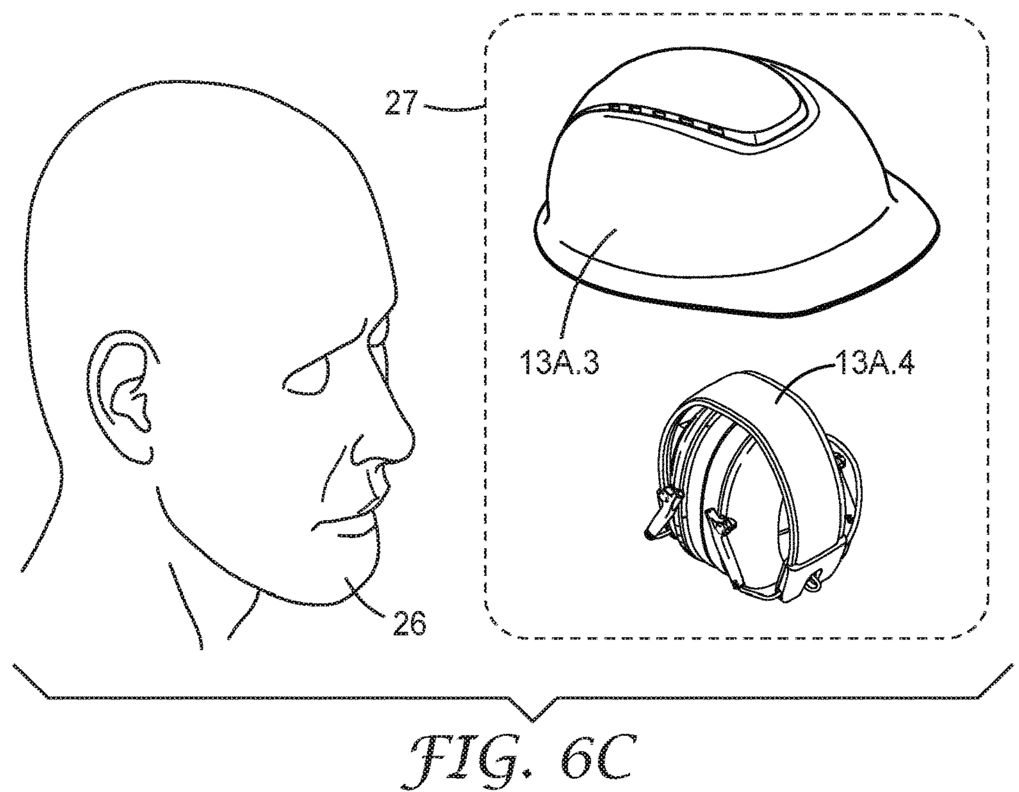
Figure 6D:
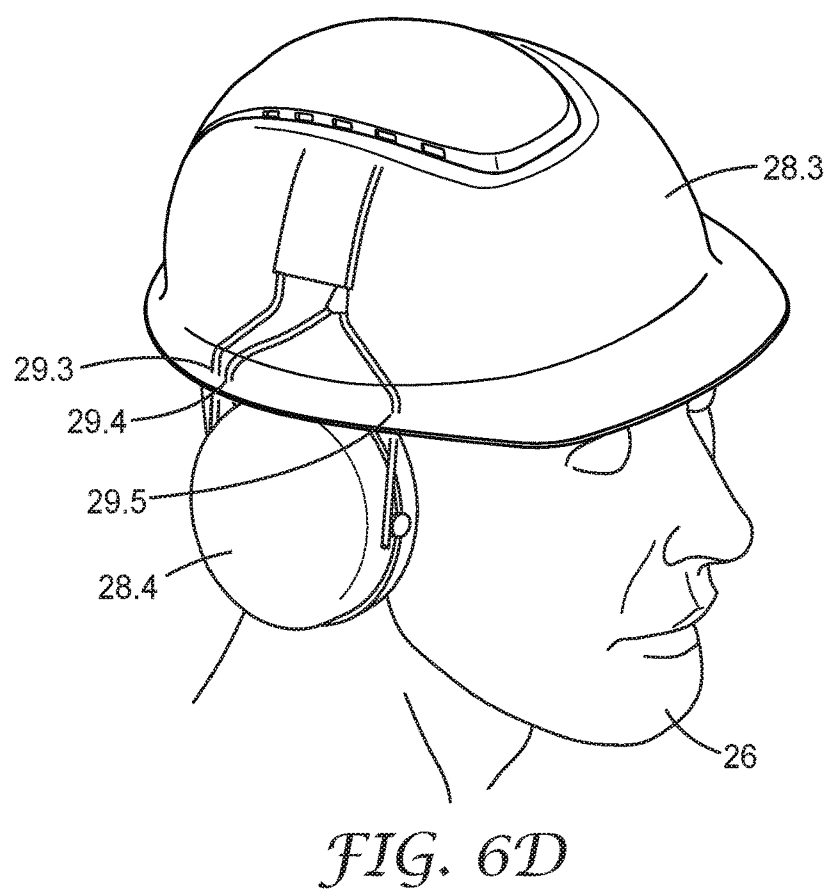

FIG. 6C illustrates the PPE set 27 to be fitted to worker 10A as including helmet 13A.3 and hearing protection 13A.4. Once again, PPEMS 6 fits PPE set 27 to the worker 10A by placing the computer models 28 of the PPEs 13A.3 and 13A.4 in position on a computer model 26 of the worker 10A, as shown in FIG. 6D. As can be seen in FIG. 6D, the interaction of computer models 26 and 28 may result in collisions 29 between the computer models 28 of the PPEs 13A and between the computer models 28 of one or more of the PPEs 13A and the computer model 26 associated with the worker 10A. In the example shown in FIG. 6D, there are collisions 29.3, 29.4 and 29.5 between the computer model 28.3 of the helmet 13A.3 and the computer model 28.4 of the hearing protection 13A.4 at the rim of the helmet. Again, shifting the positioning of one of the PPEs or bending or otherwise perturbing the model of one of the PPEs constrained by the physical attributes of the PPE may resolve the collisions.

Figure 7:
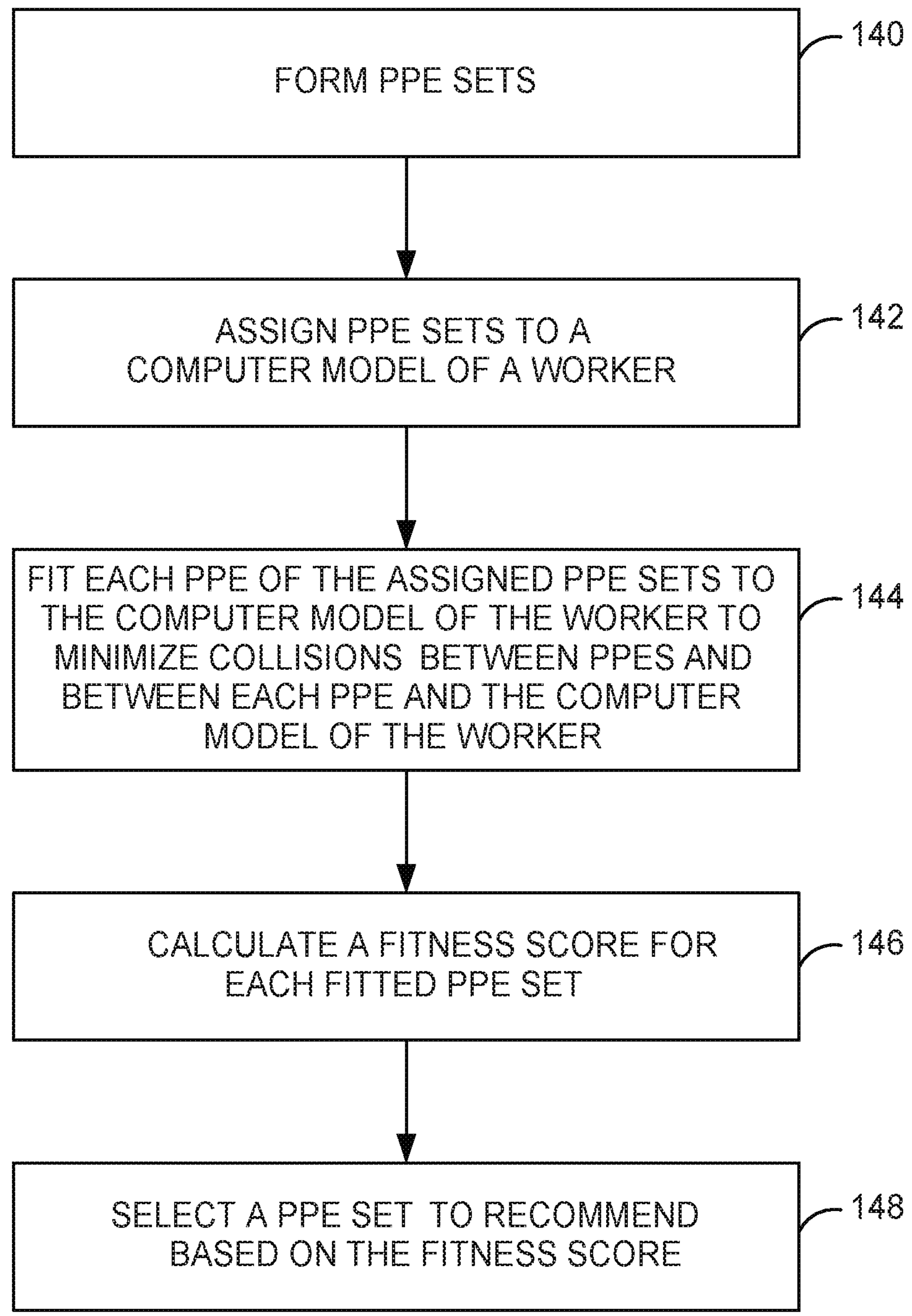
FIG. 7 is a flowchart illustrating another method of fitting a PPE set having two or more articles of PPE to a worker, in accordance with one aspect of the present disclosure.

FIG. 7 is a flowchart illustrating another method of simulating a fitting of a PPE set having two or more articles of PPE to a worker, in accordance with one aspect of the present disclosure. In the example approach of FIG. 7, PFE articles 13 are organized as PPE sets, with each PPE set including two or more PPE articles 13 (140). One or more PPE sets are assigned to a worker (142). In one example approach, PPE sets are assigned based on a worker's identity and job function. Other criteria may be used as well, such as whether the worker was trained in the use of a PPE 13. The one or more PPE sets are then fit to a computer model of the worker (144). In this example approach, PPEMS 6 attempts to reduce or remove collisions by translation or constrained perturbation at 144. A PPE-fit test then determines a fitness score for each PPE set (146) and, in one example approach, selects a PPE set to recommend for the worker based on the fitness score (148).

Figure 8:
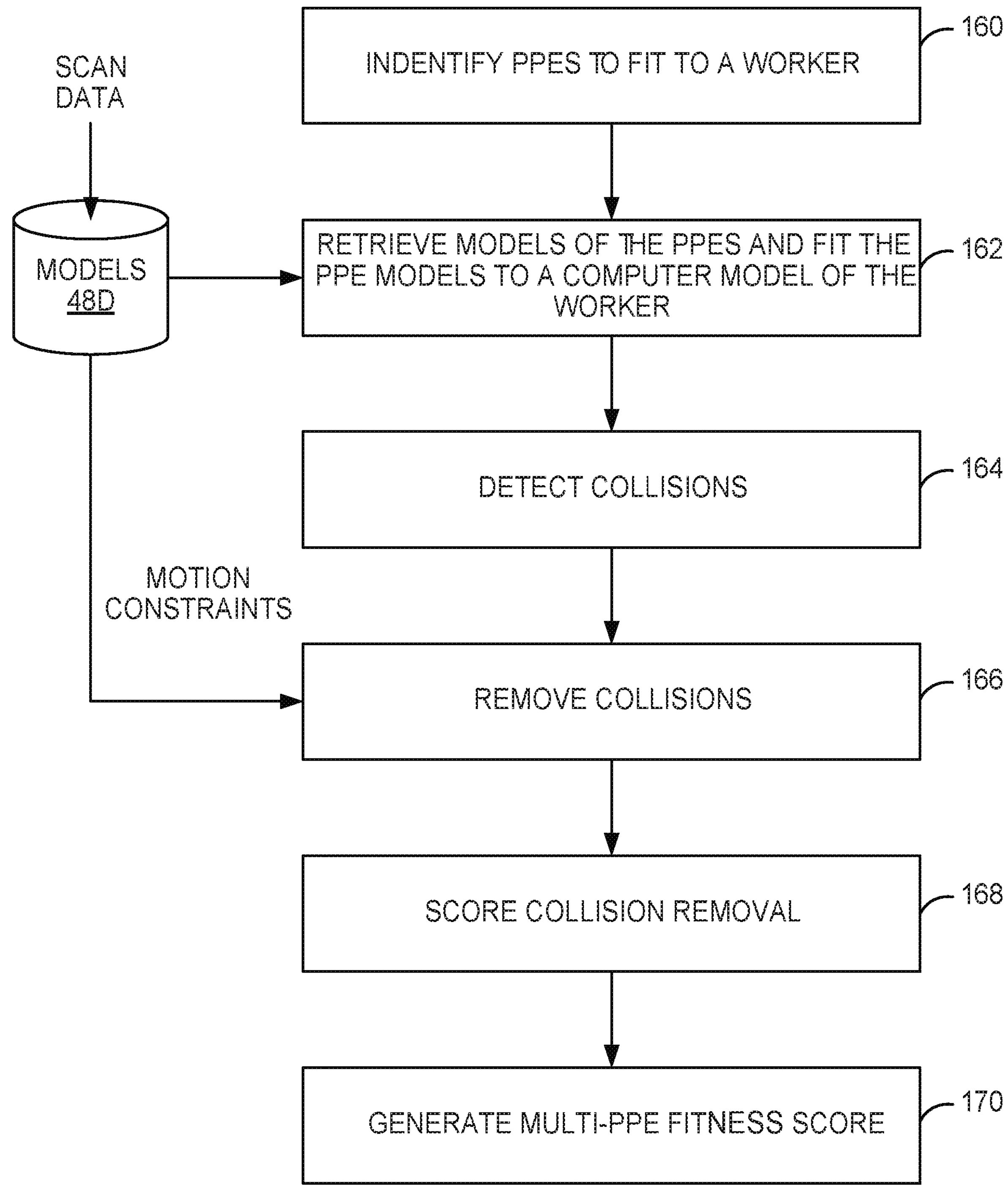
FIG. 8 is a flowchart illustrating another method of fitting sets of multiple PPEs to a worker, in accordance with one aspect of the present disclosure.

FIG. 8 is a flowchart illustrating another method of fitting sets of multiple PPEs to a worker, in accordance with one aspect of the present disclosure. In the example approach of FIG. 8, two or more PPEs are assigned to a worker (160). In one example approach, PPE sets are assigned based on a worker's identity and job function. Other criteria may be used as well, such as whether the worker was trained in the use of a PPE 13. PPEMS 6 retrieves models of the assigned PPEs from models repository 48D and fits the PPE models to a computer model of the worker (162). In one such example, PPEMS 6 retrieves the computer model representing the worker from models repository 48D as well. In another example approach, PPEMS 6 forms the computer model from a digital scan of some or all of worker 10.

In one example approach, digital models of two or more PPE are placed, at 162, on the digital 3D face scan of worker 10. The initial position of each PPE on the face may be defined manually by the operator, or the PPE may be placed automatically based on landmarks on the PPEs and landmarks on the worker's face (e.g., eyes, nose, ears, and mouth). In one example approach, PPEMS 6 detects collisions automatically identified between the multiple PPEs (164) and attempts to remove the collisions by constrained perturbations of one or more of the PPE models (166). In one example approach, a publicly available flexible collision library (fcl) may be used to identify colliding meshes. Collisions may then be removed at 166 via methods such as directional perturbation, propagated direction perturbation, gradient descent, simultaneous perturbation stochastic approximation (SPSA), grid search perturbation, a genetic algorithm, local mesh deformation at colliding surfaces or global mesh shrinking. PPEMS then scores collision removal (168) and generates a multi-PPE fitness score (170). Each of these approaches will be discussed below.

In directional perturbation, PPEMS 6 identifies an advantageous direction that a mesh or collection of mesh objects may be perturbed toward, and the object(s) are perturbed in this general direction. First, for each object, an advantageous direction, defined as a vector in three-dimensional space, is identified. This information may either be input by a user or computed based on information such as the vector opposite the penetration between the objects (Method A), the vector perpendicular to the penetration between objects (Method B), or the vector of motion towards an ideal state that does not contain any collisions or contains fewer collisions (Method C). In one example approach, a vector that is no more than an angle theta from the identified direction is randomly selected for each object. Such a step provides an element of randomness to the approach that would allow the algorithm to search a space nearby the selected direction for the optimal solution. Next, the magnitude of the perturbation is identified for each object.

In various approaches, the magnitude(s) of the vector(s) may be chosen either entirely randomly, through user input, or using some information (e.g., the penetration depth) to define the amount of perturbation, or as a scale factor on the perturbation amount. In the final step, the perturbation is applied to the mesh object(s) by shifting the object(s) by the specified magnitude(s) along their respective vector(s).

In one example approach, principle component analysis (PCA) may be used to fit contact points between two colliding objects to a plane. Penetration direction may be identified as the direction normal to the plane (e.g., the vector associated with the smallest principle component), or alternatively, as the mean of the vertex normal directions for all contact points. Penetration depth may also be computed by identifying the vertices that lie within the boundary formed by the contact points then computing the maximum point-to-plane distance when vertices are projected onto the plane along the penetration direction. The sum of the maximum point-to-plane distances for the two colliding objects is the penetration depth.

The direction perpendicular to the penetration direction may also be computed through principle component analysis (PCA). Specifically, the vectors associated with the two largest principle components are two directions that are perpendicular to the penetration direction. More generally, the vectors perpendicular to the penetration direction lie on a plane, and any of the vectors may be chosen as the perpendicular direction.

In the case that an ideal state that is either collision-free or contains fewer collisions is available, the perturbation direction vector for each object towards this ideal state may be computed as:

$$\frac{(\Delta x, \Delta y, \Delta z)}{\| (\Delta x, \Delta y, \Delta z\|}$$

In addition to the objects that are in collision, neighboring objects may also be moved using the perturbation function described above. Perturbing non-colliding objects that are nearby colliding objects has the advantage of creating space for the colliding objects to move into without creating new collisions. The method to perturb colliding mesh objects and their neighbors is like the method described above. First, a set of mesh objects that are in the local neighborhood of the colliding objects is identified. Next, the perturbation direction for each object is identified using one of the methods described above. To minimize unnecessary motion, PEMS 6 may set the magnitude of perturbation for each object to a value less than or equal to the magnitude identified for the colliding objects. One option to achieve this outcome is to scale the magnitude of perturbation according to the distance between the colliding objects and the neighboring objects, such that objects that are closer to the colliding objects have larger magnitudes, while objects farther from the colliding objects have smaller magnitudes.

Gradient descent method finds optimal PME motion by perturbing their corresponding states in a way that the collision score reduces. The problem of finding the optimal perturbation that reduces the score function is a complex nonlinear optimization problem. Although there is no guarantee for finding a global solution, deepest descent methods may be used to find the optimal direction for perturbing states that reduces the collision score to a local minimum.

In some cases, the geometries of the PPE models in collision cannot be represented in a closed mathematical form. In such cases, PPEMS 6 determines a numerical approximation of the gradient of the score function with respect to object motions. To calculate an approximation of gradient, each state may be perturbed many times so that the rate of change of the score with respect to each state may be calculated. The rate of change of the score (i.e., gradient of an objective function) is used to derive a direction vector in which to ultimately move the objects.

In one such approach, a subset of the objects in the state are identified by selecting objects that are in collision as well as adjacent objects. For each degree of freedom (or each degree of freedom corresponding to translation) in the degree of freedom vector of each object, the change in the objective function when adding and subtracting a small delta to that degree of freedom is recorded. The resulting vector of changes is normalized and treated as an estimate of the direction of the gradient of the objective function. To create a random perturbation of a state, the negative of the gradient multiplied by a scaling factor is added to the degrees of freedom vectors of the state, along with a small random component. In one such approach, the scaling factor is a random number between 0 and a maximum estimated using the penetration depths of the state.

Simultaneous Perturbation Stochastic Approximation (SPSA) is another approach for approximating gradient. To approximate the deepest descent direction using SPSA, PPESM 6 chooses a random direction to perturb the current state and calculates the rate of change of the score along that random direction.

The main benefit of SPSA method is that, to have an approximation of the perturbation direction, only two function calls of the score function are required. In comparison, the numerical gradient approximation requires 2n functions call, where n is the dimension of the state vectors. For the cases where calling the score function is computationally costly, SPSA may result a faster convergence time, since a rough approximation of the deepest descent direction can rapidly progress the optimization toward better regions. A momentum technique may be used to augment SPSA by keeping track of the history of the estimated directions for a more accurate deepest descent result.

Grid search perturbation performs perturbation by identifying mesh objects that need to be perturbed first using a penetration evaluator, as described earlier in the discussion of the directed perturbation method. Neighboring objects may be added to this list of possible objects that can be perturbed.

The perturbation itself is done by sequentially changing the state of the set of objects to move the objects towards a higher scoring state. For each object, a spatial grid of possible locations is constructed around the object location with a predetermined spatial resolution (e.g. 1 mm). As an option, some locations can be ruled out using the penetration evaluator to speed-up the search. Then by moving each object to one of the object's own grid locations, we can evaluate the collision scores. If there are three objects and nine locations for each object, that provides 729 configurations to evaluate. The best scoring configuration is chosen and then this process may be repeated over several iterations as computationally allowed, reducing the spatial resolution of the grid by a predetermined fraction e.g. 0.5 each time. The spatial grid may be constructed in, for example, Cartesian coordinates.

A genetic algorithm evolves a population of N chromosomes (solutions) over many iterations (generations), keeping the chromosomes that exhibit high fitness (designated as parents) and deleting the chromosome with low fitness (inferiors). The parents reproduce themselves, and through mutation and crossover operations produce children that pass their successful attributes to the next generation. Evolution proceeds until a criterion is met. In this case, we end evolution of an intermediate setup when we discover a state which resolves all collisions in that intermediate setup.

In one such approach, mutation involves randomly choosing one or more tuples in the chromosome and changing either the displacement or the orientation component of that tuple by a small random amount. PPEMS 6 may account for constraints on PPE movement by limiting the magnitude of displacement and orientation. In one such approach, crossover involves selecting a random index inside the pair of chromosomes and swapping the tuples that appear before (or after) this index, producing two new chromosomes. The genetic algorithm is done when one or more of the chromosomes in the population achieves a target fitness (e.g., zero collisions, or less than a certain threshold fitness score).

Local mesh deformation at colliding surfaces will be discussed next. This is an iterative process that shifts portions of mesh objects in collision until collisions are removed.

First, the contact points between two colliding objects are identified. It is possible that objects in collision may have multiple collision locations (FIG. 4). Therefore, the next step uses minimum linkage clustering to identify the contact points associated with each collision location. For each collision location, the contact points are fitted to a plane using principle component analysis (PCA). The penetration direction may be defined either as the vector that is normal to the fitted plane (i.e., the vector associated with the smallest principle component) or the mean of the vertex normal directions at the contact points. We have identified two ways to identify mesh vertices that are in collision. In the first approach, mesh objects are cut at the plane identified by PCA, and only the sub-meshes that are closest to one another are retained. The vertices of both sub-meshes are then projected onto the plane, and vertices that are within the convex hull of the contact points are identified as being in collision. In the second approach, vertices in opposing meshes that are within a small distance, d, of each other when projected onto the plane are identified as being in collision. Colliding vertices on each mesh object are subsequently shifted by a small amount, d, in a direction opposite to the penetration direction. This process is repeated iteratively until no collisions remain between the two objects.

Global mesh shrinking will be discussed next. In this process, collisions in a set of meshes are removed by shrinking entire meshes. In one such approach, PPEMS 6 identifies the meshes that are in collision, shrinks all colliding meshes by small distance d, and, if collisions remain, repeats the process. In one example approach, to shrink a mesh by distance d, PPEMS 6 may calculate the vertex normals (unit vectors) over the whole mesh, move each vertex in the direction opposite its normal by d, and may optionally smooth the vertices via averaging neighbors or nearby vertices.

The advantage of this method is that it preserves the overall shape of the meshes being modified and does not introduce sharp edges into previously smooth areas. However, if large shrink amounts are required to remove collisions, a large amount of error may be introduced.

Collision removal may be subject to PPE-specific motion constraints that describe how much each mesh object of PPE may be moved and in which directions. These motion constraints can be formulated to ensure that PPE are not displaced by an unreasonable distance from the face or from landmarks on the face during collision removal. For example, motion constraints can be used to limit displacement of a respirator beyond the mouth and nose area and away from the face surface. Alternatively, pervertex motion constraints could be enabled to allow for small deformations in the shape of the PPE 13. In one example approach, model motion constraints are stored in models repository 48D.

In the example approach of FIG. 8, scan data from digital scans of a worker are stored in models repository 48D and are used to generate worker computer models 26. In another example approach, such models 26 are adapted from other models 26.

As noted above, a multi-PPE fitness score may be generated at 170. In one example approach, the multi-PPE fitness score reflects the effectiveness of collision removal (indicating good multi-PPE fit) and may be computed as a function of one or a combination of one or more of:

1. The number of remaining collisions;
2. The penetration depth of remaining collisions;
3. The count of colliding vertices;
4. The volume of the meshes that overlap;
5. The surface area of the meshes that overlap; and
6. The cross-sectional area of the portion of the plane of intersection that falls within the overlap of meshes. Weights may also be included in the score to incorporate factors such as type of PPE, PPE material properties (e.g., deformable or rigid), and/or safety implications of poorly fitting PPE.

For example, if the goal is to fit a deformable disposable respirator and rigid eyewear together, the respirator can be slightly deformed to achieve a good fit, while the eyewear is not deformable. To represent these different material properties in the algorithm, therefore, collisions caused by deformable disposable respirators may be weighted less than collisions caused by rigid eyewear. Other non-fit-related factors may also optionally be included in the score, allowing for optimization of fit along with other considerations. For example, the optimization may consider budget (cost of each PPE) or personal preferences (e.g., color or decorative features on the PPE).

The example approach of FIG. 8 may be run many times with multiple sets of PPEs 13. In one such example approach, the best fitting set of PPEs 13 is defined as the PPE set that minimizes the multi-PPE fitness score. The method could be used to emphasize aspects of fit. For instance, the method may be configured to emphasize comfort of one type of PPE. In such an approach, the method is adapted, for instance, to enable comfortable placement of multiple PPE. Initial placement of one or several PPE where comfort is maximally important may be determined ahead of time and stored for a particular user or population. Collision algorithms could then be used to fit the remaining PPE around this PPE, with motion limits set to forbid displacing the originally placed PPE by a large amount.

Similarly, this method could be used to balance fit individually, or across an entire workforce. For instance, PPEMS 6 may seek to minimize a cost function based on the average multi-PPE fitness score across the workforce or on the maximum multi-PPE fitness score across the workforce in order to achieve a workforce level optimization.

In addition, a visual interface may be used to present fit options to user. Fit for a set of PPEs may, for instance, be displayed as a heatmap with areas with severe collisions (indicating problem areas) highlighted in red. Additionally, the visual interface may be used to provide the user with recommendations of how to wear PPE to minimize collisions. Furthermore, the collision removal process may be used to design PPEs 13 based on optimizing the multi-PPR fitness score for a worker, or to design products that fit a given population, or to predict comfort and/or fit based on collision parameters such as collision depth and collision locations.

Figure 9:
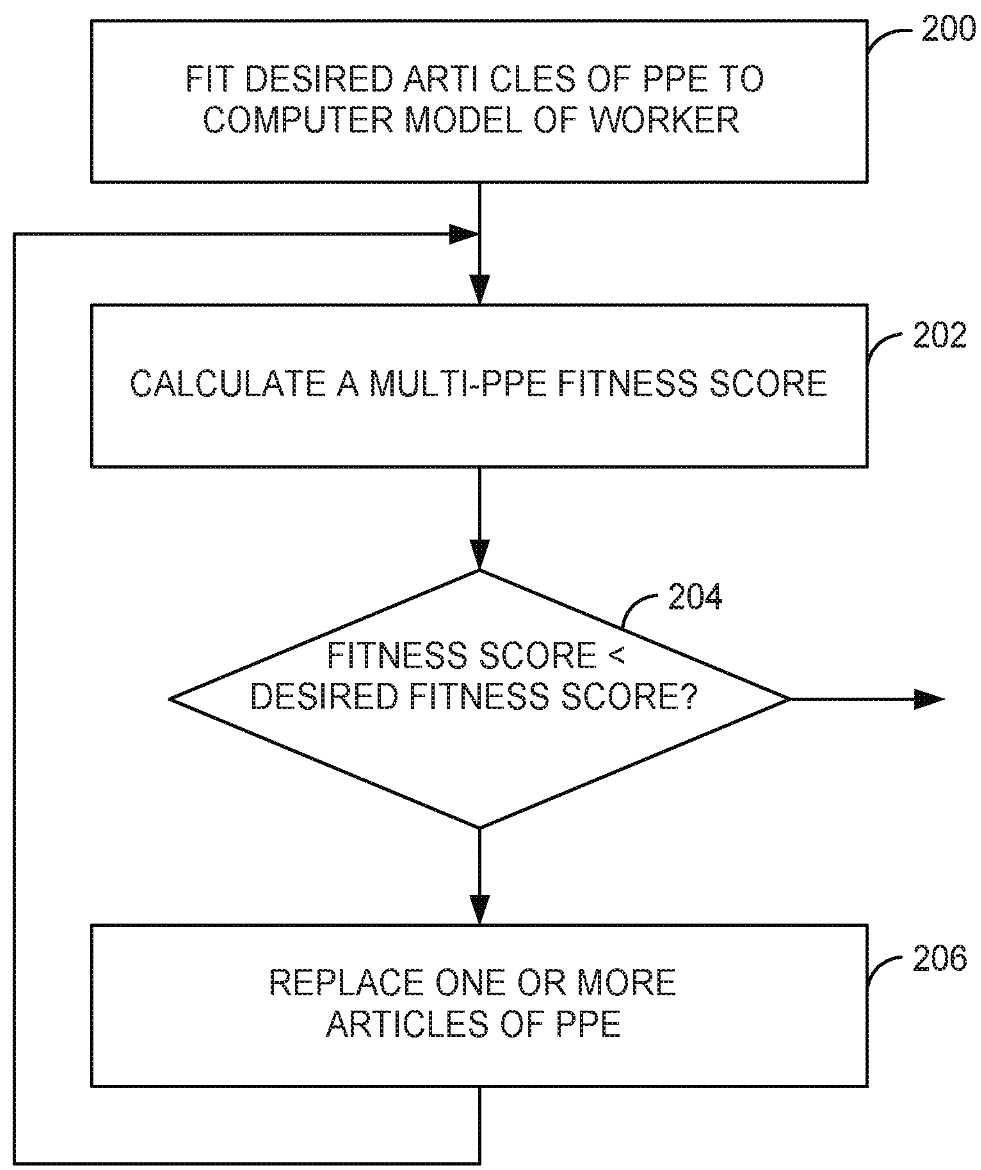
FIG. 9 is a flowchart illustrating another method of fitting multiple PPEs to a worker, in accordance with one aspect of the present disclosure.

FIG. 9 is a flowchart illustrating another method of fitting multiple PPEs to a worker, in accordance with one aspect of the present disclosure. In the example of FIG. 9, PPEMS 6 fits desired computer models of PPEs to a computer model of a worker (200) and calculates a multi-PPE fitness score as described above (202). The multi-PPE fitness score is compared to a desired fitness score (204) and, if the fitness score is less than the desired fitness score, one or more articles of PPE are replaced, and the process repeated (206).

Figure 10:
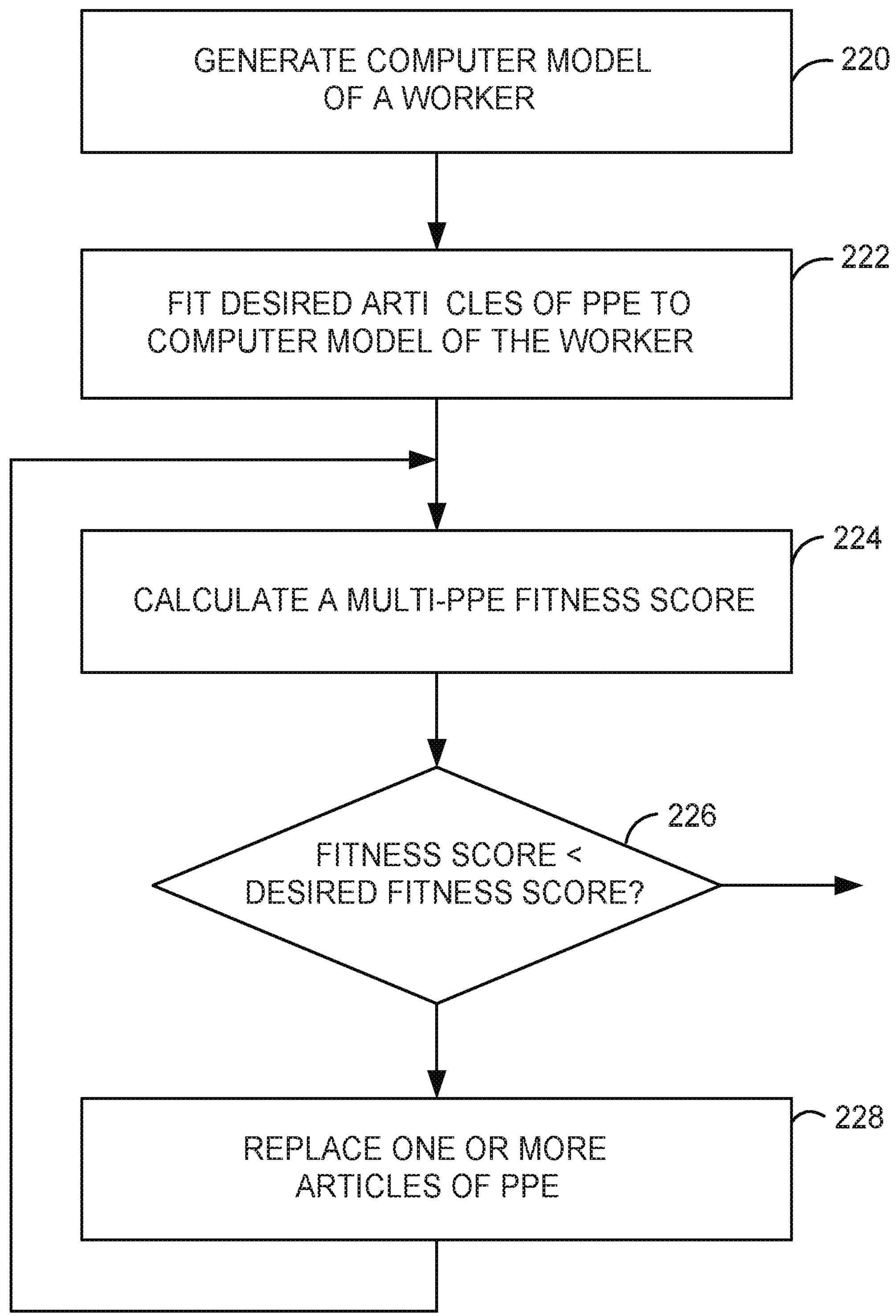
FIG. 10 is a flowchart illustrating another method of fitting multiple PPEs to a worker, in accordance with one aspect of the present disclosure.

FIG. 10 is a flowchart illustrating another method of fitting multiple PPEs to a worker, in accordance with one aspect of the present disclosure. In the example of FIG. 10, PPEMS 6 generates a computer model of all or a portion of a worker (220). For instance, PPEMS 6 may generate a model of the face or head as shown in FIGS. 5A-5D for use in fitting PPEs to a worker's face or head. PPEMS 6 then fits desired computer models of PPEs to a computer model of a worker (222) and calculates a multi-PPE fitness score as described above (224). The multi-PPE fitness score is compared to a desired fitness score (226) and, if the fitness score is less than the desired fitness score, one or more articles of PPE are replaced, and the process repeated (228).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques may be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples of the disclosure have been described. These and other examples are within the scope of the following claims.

What is claimed is:

1. A system comprising:

a display; and a computing device coupled to the display, wherein the computing device comprises a memory and one or more processors coupled to the memory, wherein the memory comprises instructions that when executed by the one or more processors:

identify one or more sets of Personal Protective Equipment (PPE), wherein each of the PPE sets includes at least two or more PPE articles;

simulate a fitting of the PPE articles of the identified one or more PPE sets to the at least one of a face or head of a worker, wherein the instructions that when executed by the one or more processors simulate the fitting of the PPE articles to the worker comprise instructions that when executed, cause the one or more processors to, for each of the identified PPE sets:

select a three-dimensional computer model for each PPE article of the PPE set;

obtain a computer model representing the worker, wherein the computer model representing the worker depicts at least a portion of the worker;

determine, for the PPE set being fitted, a placement of the computer model of each of the PPE articles of the PPE set on the computer model representing the worker;

identify at least one collision between the computer models as placed; and perform at least one operation based on the identified collisions that comprises calculating a multi-PPE fitness score for each PPE set that is weighted based on safety implications of poorly fitting PPE; and output, on the display and based at least in part on the at least one operation, one or more messages reflective of the operation.

2. The system of claim 1, wherein the multi-PPE fitness score for each PPE set is calculated as a function of the collisions between the computer models.

3. The system of claim 2, wherein one or more of the messages includes a message recommending a selected one of the identified one or more PPE sets based on the multi-PPE fitness score.

4. The system of claim 2, wherein one or more of the messages includes a message recommending a selected one of the identified one or more PPE sets for use by the worker based on a monetary cost associated with each identified PPE set and on the multi-PPE fitness score calculated for the worker for each identified PPE set.

5. The system of claim 1, wherein the multi-PPE fitness score for each PPE set is calculated as a function of one or more of:

i) collisions remaining;

ii) a penetration depth of remaining collisions;

iii) a count of colliding vertices;

iv) a volume of the meshes that overlap;

v) a surface area of the meshes that overlap;

vi) a cross-sectional area of the portion of the plane of intersection that falls within the overlap of meshes; and vii) discrepancies between scores at symmetric locations on the PPE.

6. The system of claim 5, wherein the instructions that when executed by the one or more processors compute the multi-PPE fitness score as a function of discrepancies between scores at symmetric locations on the PPE include instructions that when executed cause the one or more processors to compute the discrepancies based on one or more of the difference, absolute difference, variance or standard deviation of the scores.

7. The system of claim 1, wherein the instructions that when executed by the one or more processors perform at least one operation based on the identified collisions include instructions that when executed cause the one or more processors to:

perturb one or more of the computer models to reduce collisions; and calculate the multi-PPE fitness score for each PPE set based on the perturbed one or more computer models.

8. The system of claim 7, wherein the instructions that when executed by the one or more processors calculate a multi-PPE fitness score for each PPE set based on the perturbed one or more computer models include instructions that when executed cause the one or more processors to compute the multi-PPE fitness score as a weighted function of one or more of:

i) collisions remaining;

ii) a penetration depth of remaining collisions;

iii) a count of colliding vertices;

iv) a volume of the meshes that overlap;

v) a surface area of the meshes that overlap; and vi) a cross-sectional area of the portion of the plane of intersection that falls within the overlap of meshes; and vii) discrepancies between scores at symmetric locations on the PPE.

9. The system of claim 8, wherein the weights further incorporate the contributions of one or more of a type of PPE or PPE material properties.

10. The system of claim 7, wherein the instructions that when executed by the one or more processors perturb one or more of the computer models include instructions that when executed cause the one or more processors to translate one of the computer models in a direction.

11. The system of claim 7, wherein the instructions that when executed by the one or more processors perturb one or more of the computer models include instructions that when executed cause the one or more processors to determine a translation direction and magnitude and translate one of the computer models in the translation direction at the determined magnitude.

12. The system of claim 11, wherein the instructions that when executed by the one or more processors determine a translation direction and magnitude include instructions that when executed cause the one or more processors to apply one or more of gradient descent analysis, simultaneous perturbation stochastic approximation, grid search perturbation and a genetic algorithm to the collisions.

13. The system of claim 7, wherein the instructions that when executed by the one or more processors perturb one or more of the computer models include instructions that when executed by the one or more processors systematically vary model parameters of one or more of the computer models.

14. The system of claim 7, wherein the instructions that when executed by the one or more processors perturb one or more of the computer models include instructions that when executed by the one or more processors modify one or more of the computer models under one or more constraints.

15. The system of claim 7, wherein the instructions that when executed by the one or more processors perturb one or more of the computer models include instructions that when executed by the one or more processors move mesh vertices that are in collision.

16. The system of claim 7, wherein the instructions that when executed by the one or more processors perturb one or more of the computer models include instructions that when executed by the one or more processors shrink one or more of the computer models that are in collision.

17. The system of claim 1, wherein the computer model representing the worker includes a model of the worker's head, wherein the first article of PPE includes one or more of a mask and a respirator and wherein the second article of PPE includes one or more of safety goggles and safety glasses.

18. The system of claim 1, wherein the computer model representing the worker includes a model of the worker's head, wherein the first article of PPE includes one or more of hearing protection and a helmet and wherein the second article of PPE includes one or more of safety goggles and safety glasses.

19. The system of claim 1, wherein the instructions that when executed by the one or more processors identify one or more sets of Personal Protective Equipment (PPE) include instructions that when executed by the one or more processors select, based on the worker's identity, one or more candidates for each PPE and determine PPE sets that include the selected PPE candidates.

20. The system of claim 1, wherein the instructions that when executed by the one or more processors identify one or more sets of Personal Protective Equipment (PPE) include instructions that when executed by the one or more processors select, based on the worker's identity and job function, one or more candidates for each PPE and determine PPE sets that include the selected PPE candidates.

* * * * *